United States Patent [19]
Ito et al.

[11] Patent Number: 5,892,634
[45] Date of Patent: Apr. 6, 1999

[54] METHOD AND APPARATUS FOR HEAT POSITIONING CONTROL IN DISK STORAGE SYSTEM

[75] Inventors: Hiroshi Ito, Iruma; Shinobu Shinpuku, Tokyo; Toshikuni Sato, Tokyo; Tomihisa Ogawa, Tokyo, all of Japan

[73] Assignee: Kabushiki Kaisha Toshiba, Kawasaki, Japan

[21] Appl. No.: 692,463

[22] Filed: Aug. 5, 1996

[30] Foreign Application Priority Data

| May 23, 1995 | [JP] | Japan | 8-128356 |
| Aug. 24, 1995 | [JP] | Japan | 7-215588 |
| Nov. 13, 1995 | [JP] | Japan | 7-294059 |

[51] Int. Cl.⁶ ............................................... G11B 5/596
[52] U.S. Cl. ........................................ 360/77.08; 360/48
[58] Field of Search ........................... 360/77.08, 77.11, 360/77.02, 77.05, 48

[56] References Cited

U.S. PATENT DOCUMENTS

| 5,268,803 | 12/1993 | Sugita et al. | 360/77.08 |
| 5,274,510 | 12/1993 | Sugita et al. | 360/77.08 |
| 5,381,281 | 1/1995 | Shrinkle et al. | 360/77.08 |
| 5,384,671 | 1/1995 | Fisher . | |
| 5,459,623 | 10/1995 | Blagaila et al. | 360/77.08 |
| 5,600,506 | 2/1997 | Baum et al. | 360/77.08 |
| 5,646,797 | 7/1997 | Kadlec et al. | 360/77.08 |
| 5,659,436 | 8/1997 | Yarmchuk et al. | 360/77.08 |

FOREIGN PATENT DOCUMENTS

| 1-124169 | 5/1989 | Japan . |
| 4-353679 | 12/1992 | Japan . |

*Primary Examiner*—Nabil Hindi
*Attorney, Agent, or Firm*—Finnegan, Henderson, Farabow, Garrett & Dunner, L.L.P.

[57] ABSTRACT

A disk storage system uses a disk on which servo data used for head positioning control is recorded as a storage medium. On the disk, servo burst data constructed by first to eighth burst patterns (A to H) having a recording width which is the same as a track width are recorded in a plurality of servo sectors provided in each track. The first and second burst patterns (A, B) are arranged in the opposite positions in the radial direction with the track center set as a reference (boundary position). The third and fourth burst patterns (C, D) are arranged in the opposite positions in the radial direction with the boundary between the adjacent tracks set as a reference. The fifth and sixth burst patterns (E, F) are arranged in the opposite positions in the radial direction with a preset position X1 in the range of the track set as a reference. The seventh and eighth burst patterns (G, H) are arranged in the opposite positions in the radial direction with a preset position X2 in the range of the track set as a reference.

2 Claims, 14 Drawing Sheets

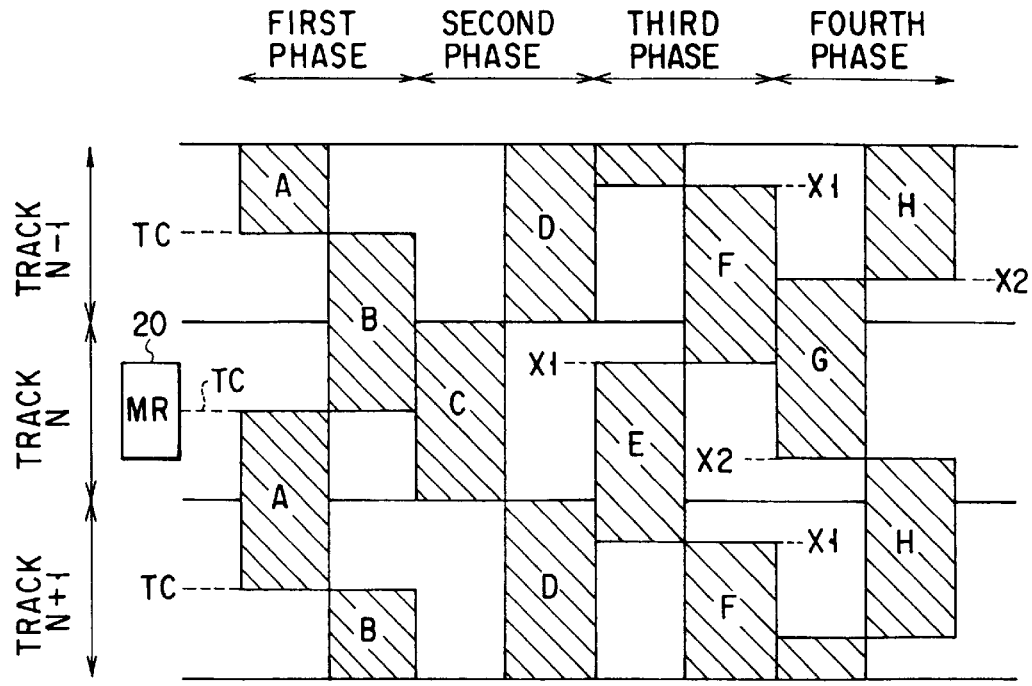
F I G. 1
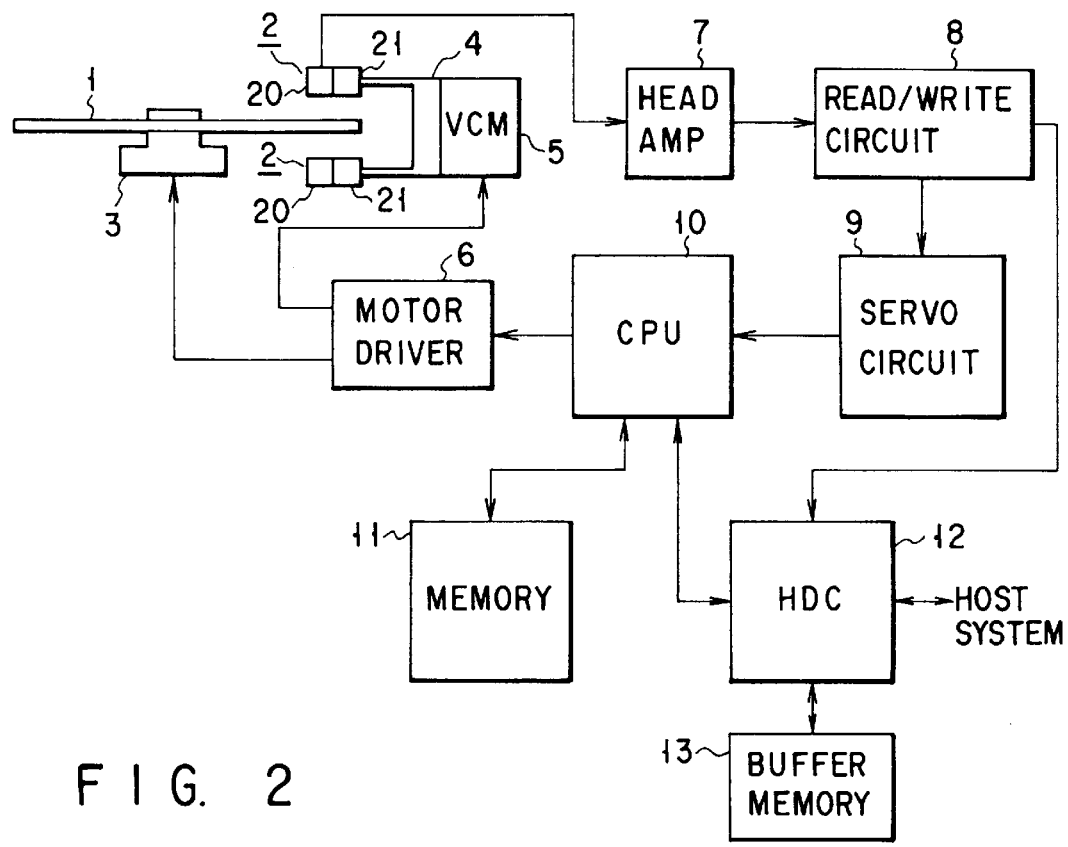
F I G. 2

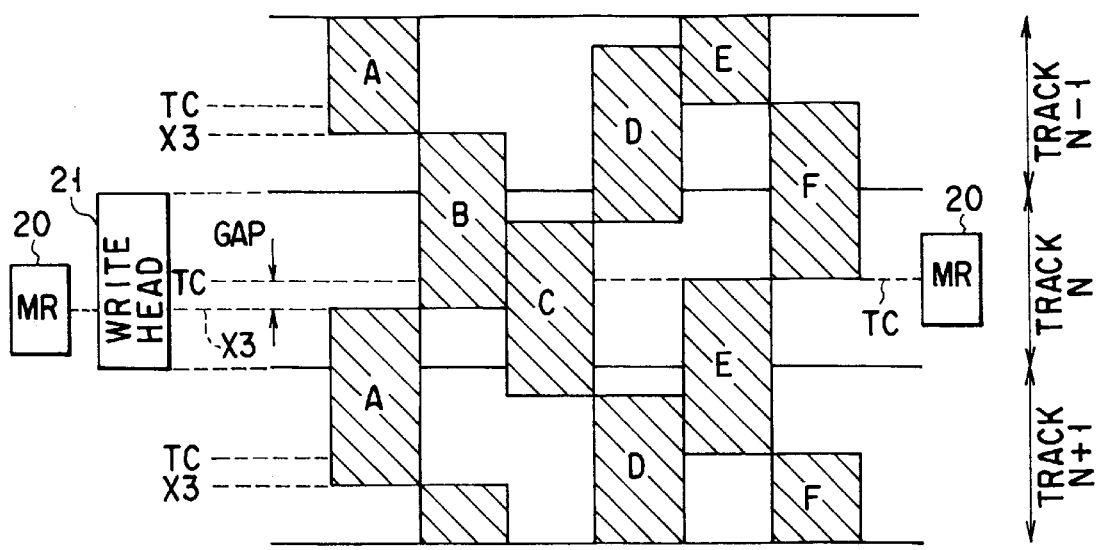
F I G. 11
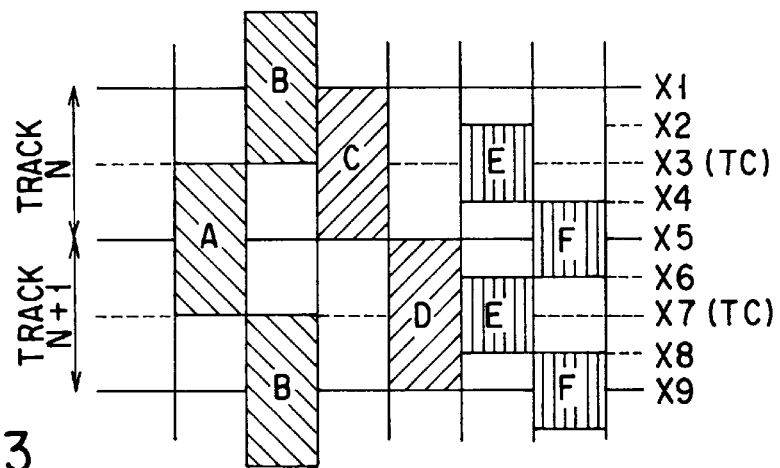
F I G. 13
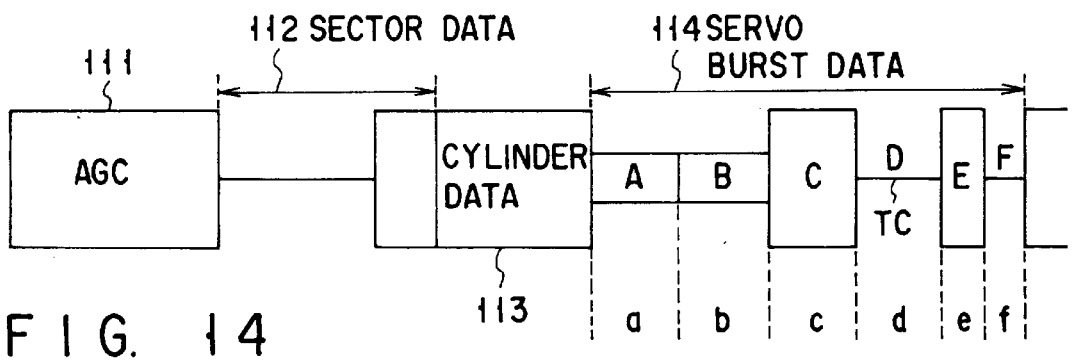
F I G. 14

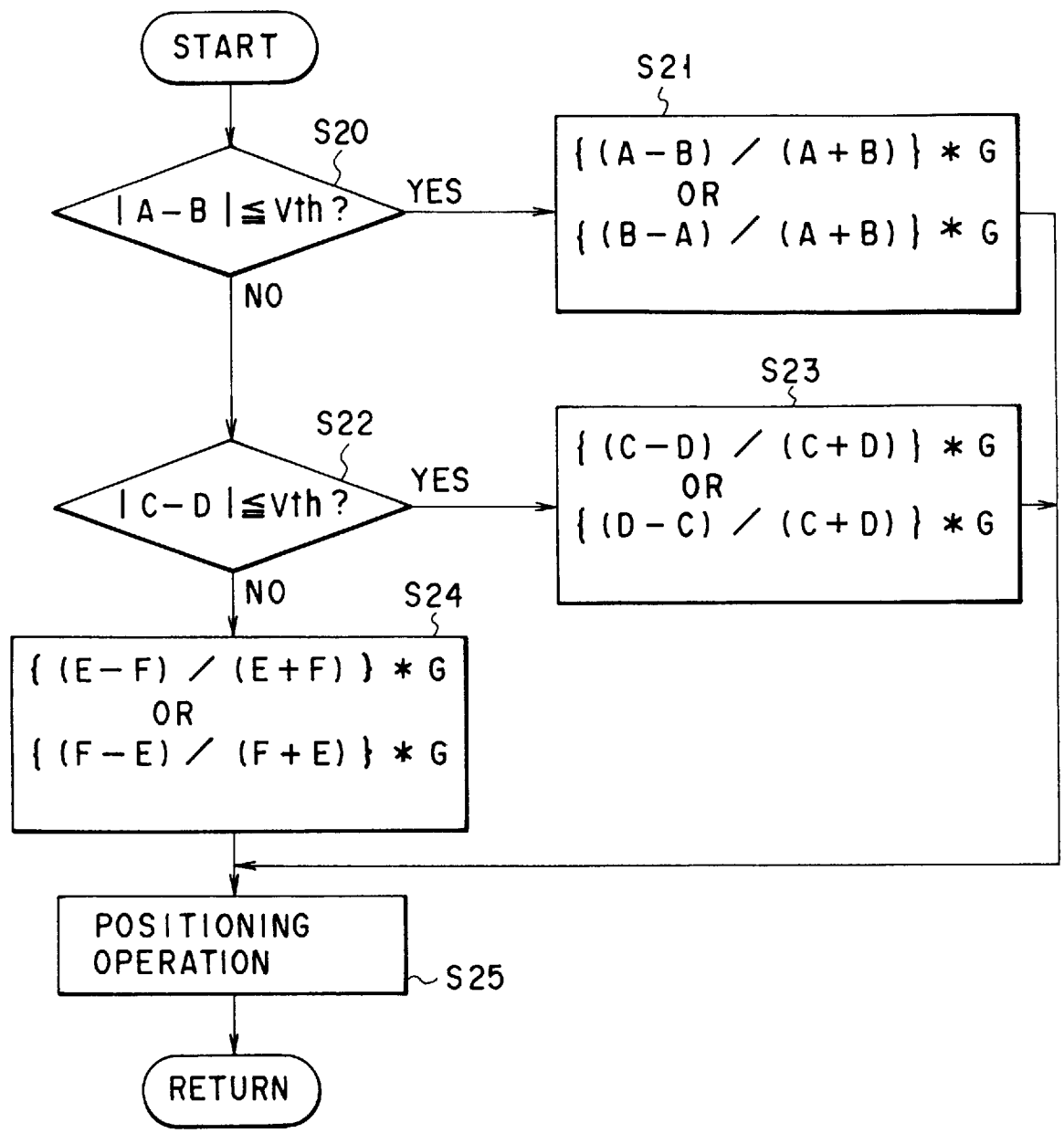
F I G. 15

METHOD AND APPARATUS FOR HEAT POSITIONING CONTROL IN DISK STORAGE SYSTEM

BACKGROUND OF THE INVENTION

1. Field of the Invention

This invention relates to a disk storage system applied to a hard disk drive, for example, and using a disk on which servo burst data for controlling the positioning of a head for recording and reproducing data is recorded as a data recording medium.

2. Description of the Related Art

Conventionally, a disk storage system such as a hard disk drive (HDD) is used as a device which uses a disk as a data recording medium, records data on the disk by use of a head and reproduces data from the disk.

In a small HDD, a sector servo type head positioning control apparatus for controlling the positioning of the head on a target track (target cylinder) on the disk according to servo information previously recorded on the disk is provided. The head positioning control mainly includes the seeking operation for moving the head to a target track and the track following control operation (which is a positioning operation in a narrow sense) for positioning the head in a range of the target track or at the center thereof.

In the sector servo system, servo information previously recorded on servo sectors arranged at preset intervals on each of the concentric tracks on the disk is used. Each track has a preset number of data sectors arranged between the servo sectors and user data is recorded in the data sector. The servo information mainly includes cylinder data (track address code) used for the seeking operation and servo burst data relating to this invention.

The servo burst data is constructed by a plurality of burst patterns for deriving a positional error (position data) of the head in a range of the target head or in a range to the adjacent track after the head is moved to a position near the target track by the seeking operation. The CPU of the head positioning control apparatus converts the amplitude of a position signal waveform obtained when the head reads the burst pattern into digital data and effects the processing operation for deriving the positional error by using the digital data.

As shown in FIG. 7A, the servo burst data is constructed by first to fourth burst patterns A, B, C, D recorded in part of the servo sector. Among them, the first and second burst patterns A and B adjacent to each other make a pair of patterns having different phases and are used as a set of first phase. Further, the third and fourth burst patterns C and D adjacent to each other make a pair of patterns having different phases and are used as a set of second phase.

The recording width of each of the burst patterns A, B, C, D is the same as one track width. As shown in FIG. 7A, the burst patterns A and B are alternately arranged in the radial direction of the disk with the center TC of the track (N) set as a boundary. The burst patterns C and D are alternately arranged with the boundary between the adjacent tracks set as a reference.

In the head positioning control, the seeking operation is effected by use of cylinder data read out by the head and the head is moved to a specified target track. In this case, it is supposed that an MR head which is a read head 20 to be described later has been moved to a target track N as shown in FIG. 7A. In the head positioning control, the seeking operation is changed over to the track following control operation. By the track following control operation, the read head 20 is positioned at the center TC of the target track N.

In the track following control operation, the read head 20 reads out position signals from the burst patterns A, B, C, D. The head positioning control apparatus samples and holds the amplitude values of the burst patterns A, B, C, D, converts the amplitude values into digital data by use of an A/D converter, and then outputs the digital data to the CPU. The CPU effects the arithmetic operation "(A−B)/(A+B)" by using the amplitude values A and B corresponding to the first and second burst patterns A and B to derive a positional error of the read head 20. Likewise, the CPU effects the arithmetic operation "(C−D)/(C+D)" by using the amplitude values C and D corresponding to the third and fourth burst patterns C and D to derive a positional error of the read head 20.

In this case, the results of the arithmetic operations for positional errors by the CPU can be expressed as shown in FIGS. 7B and 7C. That is, when the read head 20 is positioned on the center TC of the track N as shown in FIG. 7A, the positional error is "0". If the read head 20 is set in position shifted in a direction towards the burst pattern A, the amount of positional error changes towards "+1" as shown in FIG. 7B. On the other hand, if the read head 20 is set in position shifted in a direction towards the burst pattern B, the amount of positional error changes towards "−1" as shown in FIG. 7B. If the read head 20 is positioned in the range of the burst pattern A or B, the amount of positional error is fixedly set at "+1" or "−1", respectively. Therefore, if the read head 20 is deviated from the track center TC and is set closer to the boundary with the adjacent track (N+1 or N−1), an area (non-sensible area) NS in which the positional error of the read head 20 cannot be detected occurs. Therefore, the CPU derives the positional error of the read head 20 with the boundary between the adjacent tracks set as a reference by using the amplitude values C and D corresponding to the third and fourth burst patterns C and D.

Thus, in the conventional head positioning control apparatus, a method using the linear sections LS of the positional error characteristics based on the two-phase burst patterns A, B and C, D as shown in FIGS. 7B, 7C to detect the positional error of the head 20 in the entire track range is used.

Recently, in the HDD, a reproduction/recording separation type head using an MR (magnetroresistive) head as a read head has received much attention in order to realize the high-density recording. As shown in FIG. 8, a reproduction/recording separation type head 2 has a composite head structure in which an MR head used as the read head 20 and a write head 21 using an induction type thin-film head are mounted on a slider. In other words, the reproduction/recording separation type head 2 has a structure in which two gaps including a read gap of the MR head and a write gap of the induction type head are formed on one slider.

In the reproduction/recording separation type head 2, the head width of the write head 21 is substantially equal to the track width and the head width of the read head 20 is approximately equal to half the track width. At the time of data reading operation, the CPU positions the read head 20 at the center TC of the track based on servo burst data read out by the read head 20 as described before. On the other hand, at the time of data writing operation, the CPU positions the write head 21 at the center TC of the track, that is, in the range of the track. At this time, the positioning control for the write head 21 is effected based on servo burst data read out by the read head 20. In the reproduction/recording separation type head 2, the centers of the gaps of the read head 20 and write head 21 are deviated from each other for the structural reason. Therefore, at the time of data writing operation, the read head 20 reads out burst data not in the track center TC but in position (off-track position) slightly deviated from the track center TC as shown in FIG. 8. As a result, at the time of data writing operation, the read head 20 cannot correctly read out the burst patterns A to D in some cases, and in this case, it becomes impossible to precisely position the write head 21 at the center TC of a target track.

Further, the head width of the read head 20 is smaller than the track width as described before. Therefore, at the time of data reading operation, the influence of fringe noise occurring in the boundary area between the adjacent tracks can be avoided. However, if the head width is relatively small, the range of the linear section LS for detecting the positional error in the positional error characteristic becomes relatively narrow and the non-sensible area NS in which the positional error cannot be detected is enlarged to a range indicated by broken lines. If the non-sensible area NS is large, a range in which the position of the head lying in the track range cannot be detected becomes large. Therefore, it takes a long time for the settling operation for precisely positioning and holding the head 20 at the track center TC in the head positioning control and the positioning precision is lowered.

SUMMARY OF THE INVENTION

An object of this invention is to provide a head positioning control apparatus which can be used for a disk recording/reproducing system using an MR head having a head width smaller than the track width as a read head, for effecting the read head positioning control based on servo burst data read out from the disk by use of the read head and which can precisely read out servo burst data by use of the read head and precisely position the read head to a target position.

An apparatus for head positioning control of this invention is an apparatus comprising control means for using a disk in which servo burst data for positioning the head in a range of a track is previously stored and deriving a positional error of the head in the range of the track based on the servo burst data; and actuator means for positioning the head to a preset position in the range of the track.

In the disk, servo burst data constructed by first to sixth burst patterns (A to F) of a recording width which is the same as the track width is recorded on a plurality of servo sectors provided in each of the tracks. The first and second burst patterns (A, B) which are adjacent to each other are arranged in the opposite positions in the radial direction with the track center set as a reference (boundary position). The third and fourth burst patterns (C, D) which are adjacent to each other are arranged in the opposite positions in the radial direction with the boundary between the adjacent tracks set as a reference. The fifth and sixth burst patterns (E, F) which are adjacent to each other are arranged in the opposite positions in the radial direction with a preset position in the track range set as a reference.

The control means detects the positional error of the read head near the center of the target track according to a position signal based on the first and second burst patterns (A, B) read out by the read head. Further, it detects the positional error of the read head near the boundary between the track and an adjacent track according to a position signal based on the third and fourth burst patterns (C, D). In addition, it detects the positional error of the read head in an area in which the positional error cannot be detected by use of the first to fourth burst patterns (A to D) in a range of the track according to a position signal based on the fifth and sixth burst patterns (E, F).

By use of the servo burst data constructed by the first to sixth burst patterns (A to F), it becomes possible to suppress the non-sensible area in the positional error characteristic and increase the linear area used for detecting the positional error of the read head when the CPU derives the positional error. Therefore, even when an MR head whose head width is smaller than the track width is used as a read head, it is possible to precisely correct the positional error of the read head in the track range and attain the head positioning control with high precision.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a conceptional diagram for illustrating the construction of burst patterns relating to a first embodiment of this invention;

FIG. 2 is a block diagram showing the main portion of an HDD relating to this invention;

FIG. 11 is a conceptional diagram relating to a modification of the second embodiment;

FIG. 13 is a conceptional diagram for illustrating the construction of burst patterns relating to a third embodiment of this invention;

FIG. 14 is a conceptional diagram for illustrating the construction of a track relating to the third embodiment;

FIG. 15 is a flowchart relating to the third embodiment;

DETAILED DESCRIPTION OF THE PREFERRED EMBODIMENTS

Figure 3:
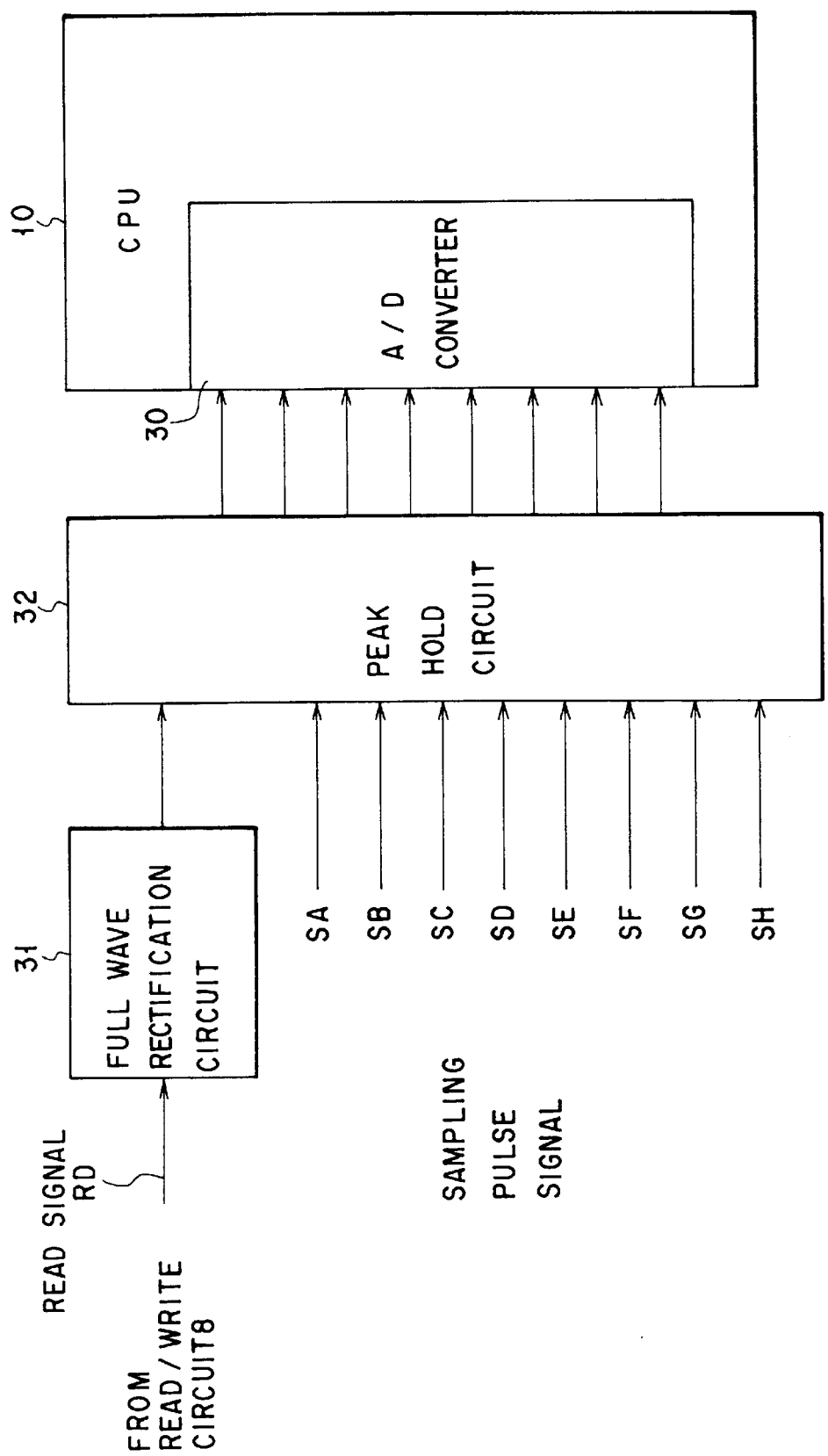
FIG. 3 is a block diagram showing the main portion of a servo circuit of the HDD relating to this invention.

There will now be described embodiments of this invention with reference to the accompanying drawings.

(System Construction)

It is supposed that a system of this embodiment is a hard disk drive (HDD) having reproduction/recording separation type heads 2 each of which includes an MR head as a read head 20 and an induction type head as a write head 21 as shown in FIG. 2.

The head 2 has a composite head structure having the read head 20 and the write head 21 mounted on a slider. The heads 2 are disposed to face the opposite surfaces of a disk 1 and held by an actuator 4. The actuator 4 is a main portion of a head driving mechanism which is driven to rotate by a voice coil motor (VCM) 5 so as to move the head 2 in the radial direction and position the head. The VCM 5 is supplied with a driving current from a motor driver 6 which is controlled by a CPU 10.

The motor driver 6 is a double driver for driving both of the VCM 5 and a spindle motor 3. The spindle motor 3 is a disk rotating motor for rotating the disk 1 at high speed. One disk or a plurality of disks (in this example, one disk is used for convenience) are fixedly mounted on the spindle motor 3 and the disk 1 has a large number of tracks formed thereon as will be described later (refer to FIG. 5).

Generally, a read/write circuit 8 is constructed by a dedicated integrated circuit and is used for effecting the signal processing operations necessary for the data read/write operation. A read signal RD read out by the read head 20 is amplified by a head amplifier 7 and then supplied to the read/write circuit 8. The read/write circuit 8 subjects the read signal RD to various signal processing operations such as the AGC (automatic gain control) amplifying process, filtering process, digital conversion process, and decoding process. The read/write circuit 8 converts the read signal RD into reproduction data of NRZ code (write data) and transfers the reproduction data to a disk controller (HDC) 12. At the time of data writing operation, the read/write circuit 8 effects the encoding process for modulating the NRZ data which is write data transferred from the HDC 12 into RLL (run-length coding) data, for example, and outputs the modulated data to the write head 21 via the head amplifier circuit 7.

Further, the read/write circuit 8 effects the process for reproducing servo information necessary for the head positioning control in addition to the normal signal process for user data. As described before, the servo information is constructed by cylinder data (track address code) used for the seeking operation and servo burst data relating to this invention. The cylinder data is recorded by use of Gray code. The read/write circuit 8 subjects a read signal (servo read signal) corresponding to cylinder data read out by the read head 20 to the binary-coding process and outputs the binary-coded signal to a servo circuit 9. The servo circuit 9 decodes the binary-coded signal into data of cylinder address (track address) and outputs the decoded data to the CPU 10. The CPU 10 recognizes the track in which the head 2 is now set according to the cylinder data at the time of seeking operation.

The read/write circuit 8 outputs a read signal corresponding to servo burst data read out by the read head 20 to the servo circuit 9 while it is kept in the analog signal state. As will be described later, the servo burst data is an analog signal waveform indicating an amplitude value corresponding to the position of each burst pattern. The servo circuit 9 includes a full-wave rectification circuit 31 and a peak hold circuit 32 as shown in FIG. 3, samples and holds peak values corresponding to respective burst patterns (A to H in the first embodiment) by use of the peak hold circuit 32 and outputs position signals corresponding to the respective peak values to the A/D converter 30 of the CPU 10. The peak hold circuit 32 holds the peak values of the amplitudes of the respective burst patterns corresponding to the position of the read head 20 according to the timing of a sampling pulse signal created in the servo circuit 9. The full-wave rectification circuit 31 and peak hold circuit 32 are explained as the constituents contained in the servo circuit 9, but they can be contained as part of the integrated circuit of the read/write circuit 8.

The CPU 10 is a control microprocessor constructing the main control device of the HDD for head positioning control or the like and constructs a micro-controller together with the A/D converter 30 and a D/A converter (not shown) for outputting a control signal. The CPU 10 accesses a memory 11 constructed by a ROM and RAM to effect the head positioning control relating to this invention. In the ROM of the memory 11, a control program (firmware) for determining the operation of the CPU 10 is stored.

The CPU 10 effects the seeking operation for moving a head 23 to a target track based on cylinder data decoded by the servo circuit 9. Further, the CPU 10 receives the peak value of servo burst data as position data of digital data by use of the A/D converter 30 and effects the operation for detecting the positional error. Based on the result of the above operation, the CPU 10 outputs a control signal for positioning the read head 20 to the center TC of the range of the target track or a control signal for canceling the positional error to the motor driver 6 via a D/A converter. That is, the CPU 10 drives the VCM 5 via the motor driver 6 according to the control signal and controls the operation of the actuator 4 to position the head 2 to the target position.

The memory 11 includes a RAM for providing a work area of the CPU 10 or the like and an EEPROM (Electrically Erasable and Programmable Read Only Memory) for storing various parameters necessary for controlling the HDD. The various parameters include data for identifying data sectors and servo sectors relating to the format on the disk. In the disk format of CDR (Constant Density Recording) system, since a large number of tracks are divided into a plurality of zones, parameters of each zone are stored in the EEPROM. In the CDR system, the number of the servo sectors is constant but the number of the data sectors is different for each zone.

The HDC 12 is a controller which is connected to the CPU 10 and constructs an interface with a host system to control the transfer of read/write data (user data). The HDC 12 exchanges a read/write command and read/write data with respect to the host system and controls a buffer memory (buffer RAM) 13 to buffer read/write data.

(Disk Format)

Figure 5:
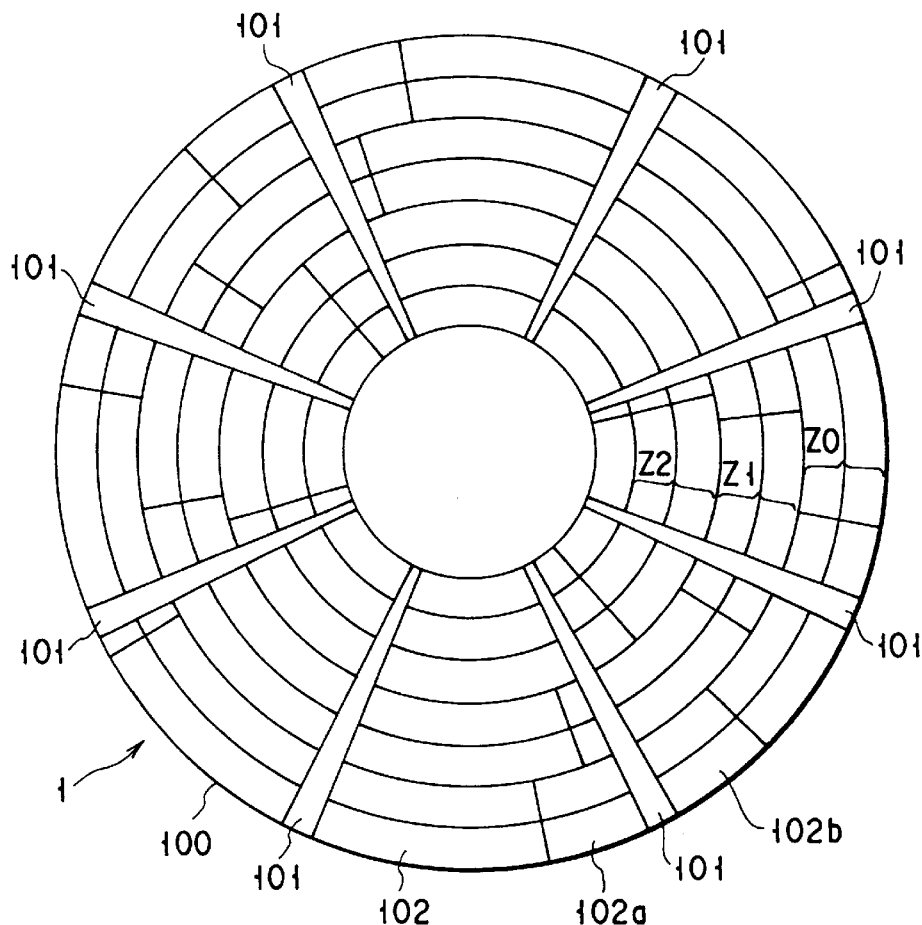
FIG. 5 is a conceptional diagram for illustrating the construction of a disk relating to this invention.
Figure 6:
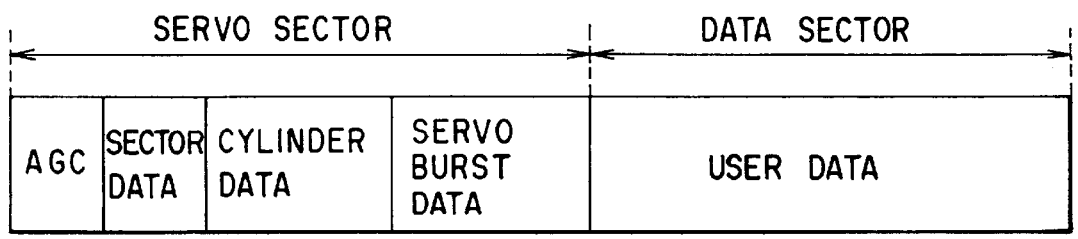
FIG. 6 is a conceptional diagram for illustrating the construction of a track relating to this invention.
Figure 7A:
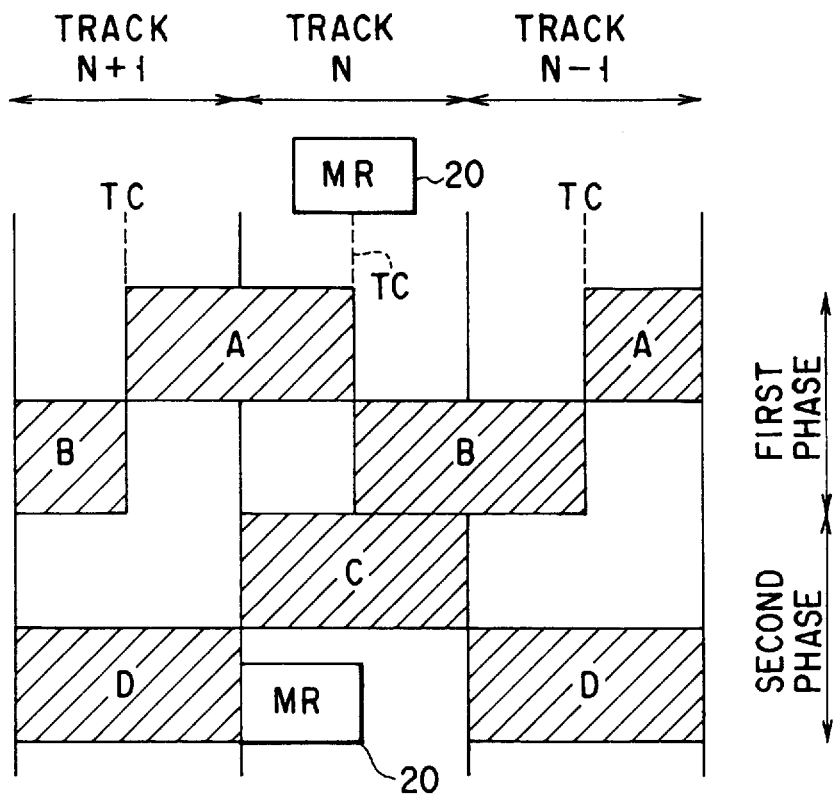
FIG. 7A is a conceptional diagram for illustrating the construction of burst patterns relating to the prior art.
Figure 7B:
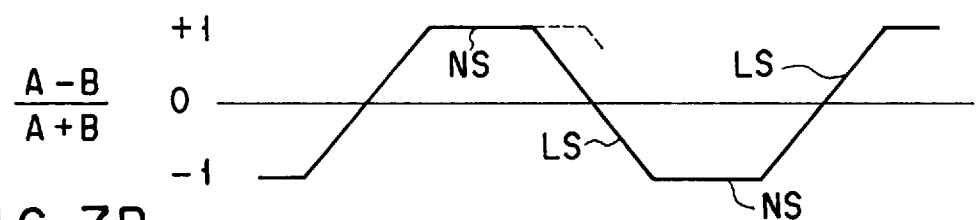
FIGS. 7B and 7C are characteristic diagrams for illustrating the positional errors relating to the prior art.
Figure 7C:
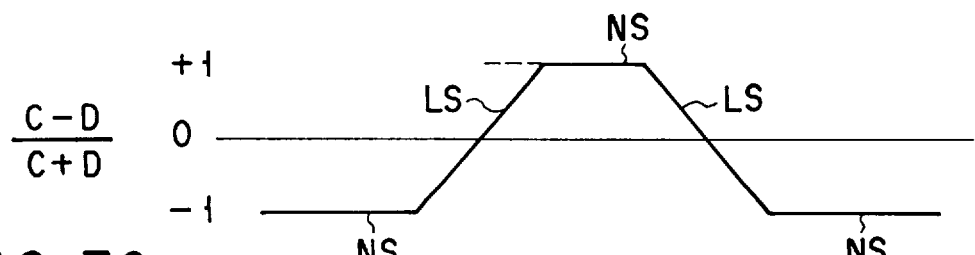

As shown in FIG. 5, a larger number of concentric tracks 100 are formed on both surfaces of the disk 1. In the CDR system, a large number of tracks 100 are divided into a plurality of zones Z0 to Z2. In each of the tracks 100, a plurality of servo sectors 101 are arranged at regular intervals. As shown in FIG. 6, in the servo sector 101, an AGC (Automatic Gain Control) area and a sector data area are provided in addition to the cylinder data area and servo burst data area described before. The AGC area is an area in which data of constant frequency for stabilizing the amplitude of a signal is recorded. The sector data area is an area in which data indicating a servo sector number is recorded. Further, in each of the tracks 100, a preset number of data sectors 102 are arranged between the servo sectors 101. The data sector 102 is an area for recording user data. In the CDR system, the number of data sectors is different for each zone.

(Construction of Servo Burst Data in First Embodiment)

FIG. 1 shows the construction of servo burst data in the first embodiment of this invention. As described before, servo burst data is recorded in the servo sector of each track. The servo burst data in the first embodiment is constructed by first to eighth burst patterns A to H arranged in preset positions. The burst patterns A to H each have a recording width which is substantially the same as one track width and are successively arranged in the radial direction of the disk at preset intervals.

The first and second burst patterns A and B which are adjacent to each other are one set of burst patterns (first phase) arranged in the opposite positions in the radial direction with the track(center (TC) set as a boundary (reference). The third and fourth burst patterns C and D which are adjacent to each other are one set of burst patterns (second phase) arranged in the opposite positions in the radial direction with the boundary between the adjacent tracks set as a reference. The fifth and sixth burst patterns E and F which are adjacent to each other are one set of burst patterns (third phase) arranged in the opposite positions in the radial direction with a preset position X1 in the track range set as a reference. Further, the seventh and eighth burst patterns G and H which are adjacent to each other are one set of burst patterns (fourth phase) arranged in the opposite positions in the radial direction with a preset position X2 in the track range set as a reference.

Figure 4A:
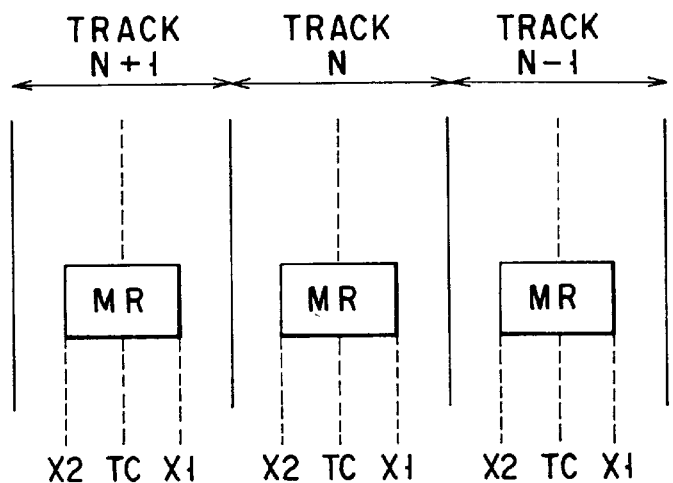
FIG. 4A is a conceptional diagram for illustrating the positional relation between the track and a read head relating to the first embodiment of this invention.
Figure 4B:
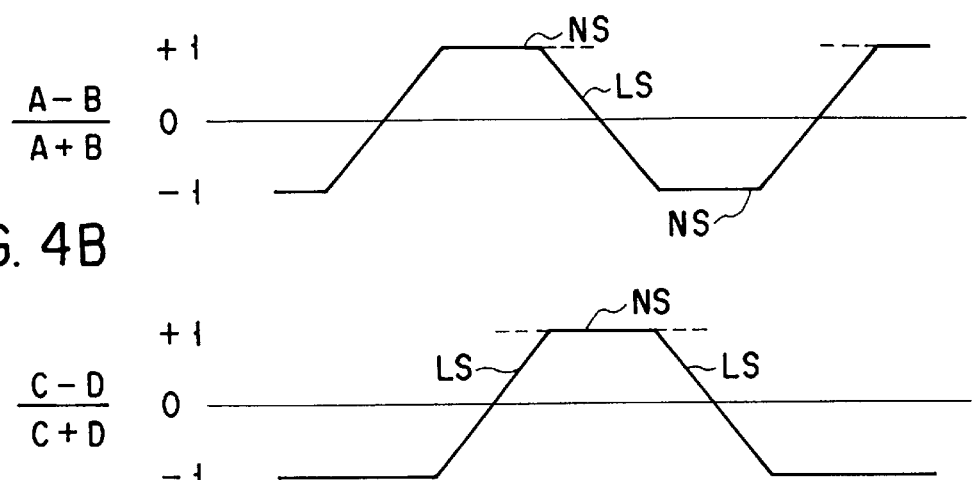
FIGS. 4B to 4E are characteristic diagrams for illustrating the positional errors relating to the first embodiment.
Figure 4C:
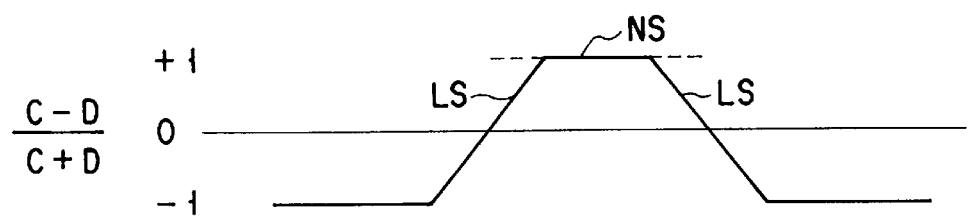

The burst patterns E, F, G and H in this embodiment are used to compensate for a portion of the non-sensible area NS occurring when the CPU 10 detects the positional error based on the position signal detected by the read head 20 which is an MR head (refer to FIGS. 4B, 4C). Therefore, the boundary position X1 between the burst patterns E and F and the boundary position X2 between the burst patterns G and H are set in positions which are offset from the track center TC by a preset amount in the opposite directions within the ranges between the track center TC and the boundaries with the respective adjacent tracks.

Next, the operation for positioning the read head 20 to the center TC of a target track N is explained. As described before, the CPU 10 effects the seeking operation based on cylinder data read out by the read head 20, controls the operation of the actuator 4 to move the head 2, that is, read head 20 to a position near the target track N or into a range thereof.

The CPU 10 changes the operation from the seeking operation to the track following control operation to receive servo burst data read out by the read head 20. That is, the CPU 10 samples and holds the amplitude values (peak values) of the position signals corresponding to the burst patterns A to H read out by the read head 20 and receives digital data converted from the amplitude values by the A/D converter 30.

The CPU effects the arithmetic operation for deriving a positional error for detecting the position of the read head 20 by using the amplitude values A to H corresponding to the burst patterns A to H. The result of the operation for positional error by the CPU can be represented as the positional error characteristics as shown in FIGS. 4B to 4E.

Assuming now that the read head 20 is positioned near the center TC of the target track N, then the CPU 10 detects the position of the read head 20 based on the value of the linear area LS of the positional error signal of "(A−B)/(A+B)" as shown in FIG. 4B. That is, if the read head 20 is set in the track center TC, the result of arithmetic operation for the positional error becomes "0". If the read head 20 is set in position deviated towards the track (N+1), the result of arithmetic operation for the positional error changes towards "+1". On the other hand, if the read head 20 is set in position deviated towards the track (N−1), the result of arithmetic operation for the positional error changes towards "−1".

Further, when the read head 20 is set in position near the adjacent track (N+1 or N−1), the CPU 10 detects the position of the read head 20 based on the value of the linear area LS of the positional error characteristic of "(C−D)/(C+D)" as shown in FIG. 4C.

As described before, the MR head used as the read head 20 has a head width which is approximately equal to half the track width or half the head width of the write head 21. Therefore, when the read head 20 is set in a range between the track center TC and the boundary with the adjacent track (N+1 or N−1), the positional error characteristics based on the burst patterns A, B and the burst patterns C, D are set in the non-sensible area NS as shown in FIGS. 4B, 4C. As a result, the CPU 10 cannot detect the positional error of the read head 20 and cannot precisely determine the position in which the read head lies in the range of the track N.

Figure 4D:
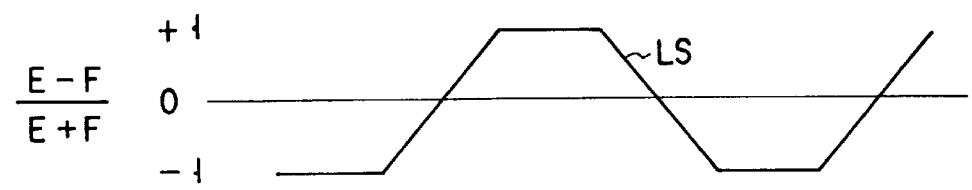
Figure 4E:
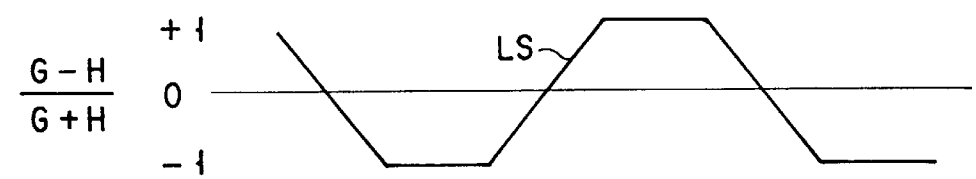

Therefore, the CPU 10 effects the processing operation for deriving the positional error to specify the position of the read head 20 based on position signals corresponding to the input burst patterns E, F and burst patterns G, H. That is, when the read head 20 is set in a range between the track center TC and the boundary with the adjacent track (N−1), the CPU 10 detects the position of the read head 20 based on the value of the linear area LS of the positional error characteristic of "(E−F)/(E+F)" as shown in FIG. 4D. If the read head 20 is set in the preset position X1, the positional error amount of "(E−F)/(E+F)" becomes "0". Further, when the read head 20 is set in a range between the track center TC and the boundary with the adjacent track (N+1), the CPU 10 detects the position of the read head 20 based on the value of the linear area LS of the positional error characteristic of "(G−H)/(G+H)" as shown in FIG. 4E. If the read head 20 is set in the preset position X2, the positional error amount of "(G−H)/(G+H)" becomes "0".

As described above, with the construction of the servo burst data shown in FIG. 1, it becomes possible to detect the positional error of the read head 20 in the entire range of the target track and precisely determine the position of the read head by using the linear area LS of the positional error characteristic based on the burst patterns A to H. Therefore, the read head 20 can be precisely positioned at the center TC of the target track N. In other words, the nonsensible area NS occurring in the positional error characteristic based on the conventional burst patterns A to D can be compensated for by use of the linear area LS of the positional error characteristic based on the conventional burst patterns A to H.

(Construction of Servo Burst Data in Second Embodiment)

Figure 9:
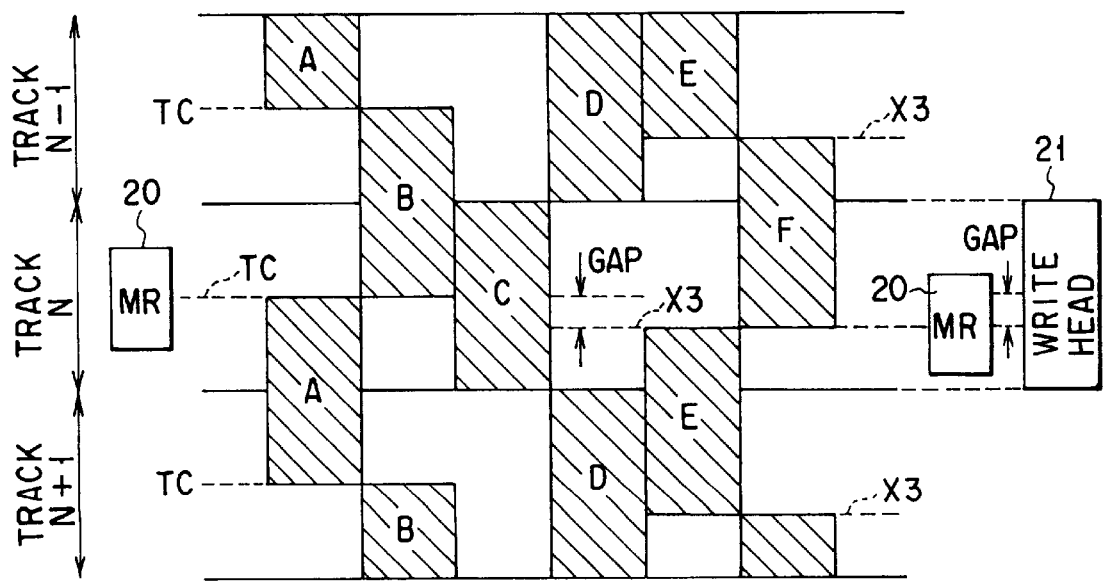
FIG. 9 is a conceptional diagram for illustrating the construction of burst patterns relating to a second embodiment of this invention.

FIG. 9 shows the construction of servo burst data in the second embodiment of this invention. The servo burst data of this embodiment is constructed by first to sixth burst patterns A to F, each of the patterns A to F has a recording width which is substantially the same as one track width, and the patterns are successively arranged at preset intervals in the radial direction of the disk. The first and second burst patterns A and B which are adjacent to each other are one set of burst patterns arranged in the opposite positions in the radial direction with the track center (TC) set as a boundary (reference). The third and fourth burst patterns C and D which are adjacent to each other are one set of burst patterns arranged in the opposite positions in the radial direction with the boundary between the adjacent tracks set as a reference.

The fifth and sixth burst patterns E and F which are adjacent to each other are one set of burst patterns arranged in the opposite positions in the radial direction with a preset position X3 in the track range set as a reference. The preset position X3 is a position which is offset from the track center TC in a preset radial direction by a preset offset amount GAP. As shown in FIG. 9, the offset amount GAP is a value corresponding to an offset amount GAP between the gap center of the MR head which is the read head 20 and the gap center of the write head 21 in the reproduction/recording separation type head 2. That is, the preset position X3 is so determined that the gap center of the MR head will coincide with the position X3 when the gap center of the write head 21 is positioned at the track center TC.

Figure 10:
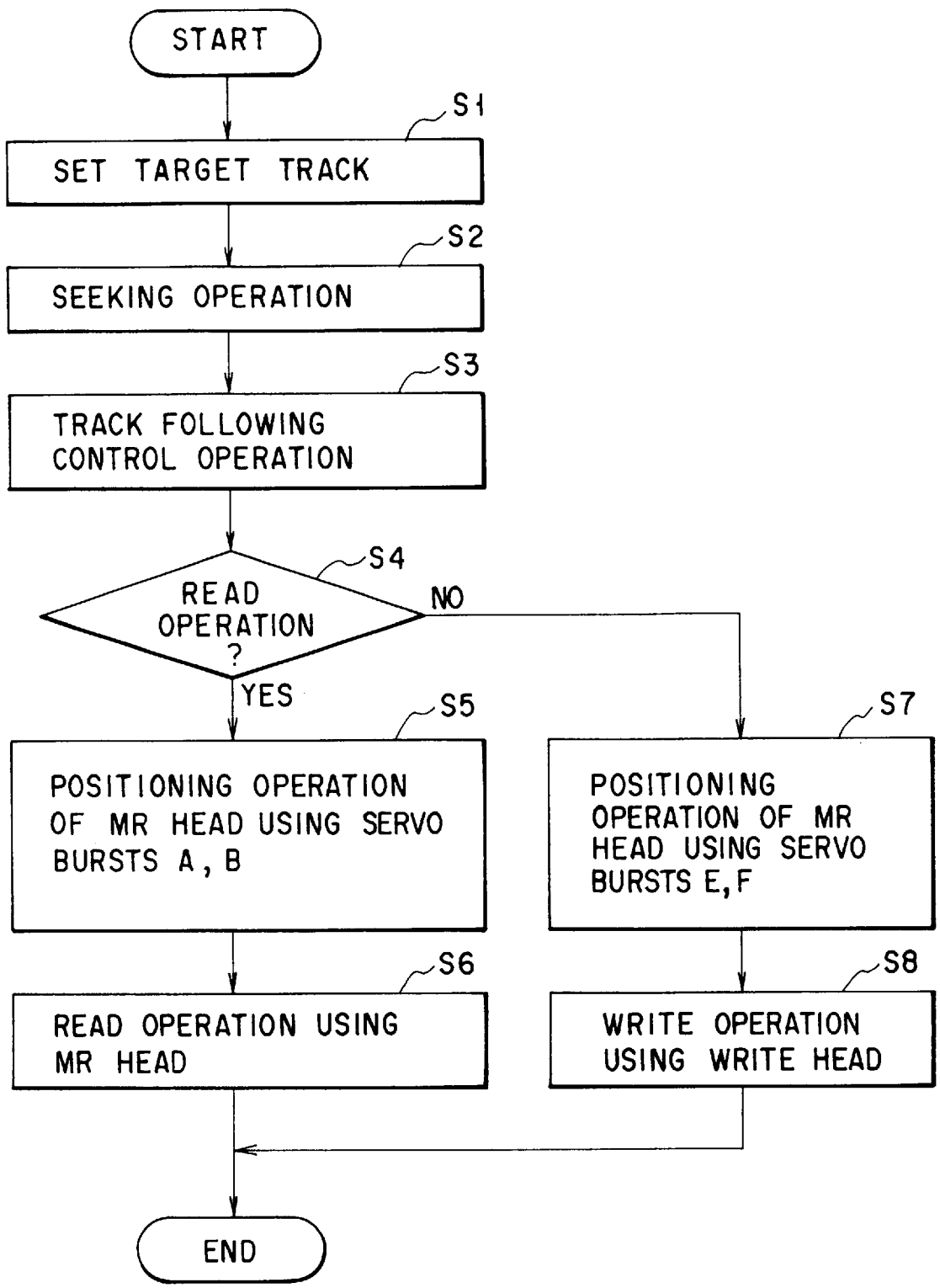
FIG. 10 is a flowchart relating to the second embodiment.

Next, the head positioning control using servo burst data of this embodiment is explained with reference to the flowchart of FIG. 10.

First, as described before, in the HDD, when a target track N is set, the CPU 10 effects the seeking operation based on cylinder data of servo information to move the head 2 to the target track N (steps S1, S2). When the head 2 has moved into the range of the target track N or to a position near the range by the seeking operation, the CPU 10 changes the operation to the track following control operation (step S3).

The CPU 10 derives the positional error used for detecting the position of the read head 20 by using amplitude values A to F corresponding to the bust patterns A to F read out by the read head 20 and then effects the control operation for positioning the read head 20 or write head 21 at the track center TC of the target track N or into the range thereof. In this embodiment, the CPU 10 selectively uses the amplitude values A, B or the amplitude values E, F corresponding to the burst patterns according to the data reading operation and writing operation. The positioning operation using the amplitude values C, D corresponding to the burst patterns C, D is the same as that explained in the first embodiment. That is, the CPU 10 detects the positional error of the read head 20 with the boundary between the target track and an adjacent track based on the amplitude values C, D.

Like the conventional case, at the time of data reading operation, the CPU 10 positions the read head 20 at the center TC of the target track N based on the amplitude values A, B corresponding to the burst patterns A, B read out by the read head 20 ("YES" in the step S4 and step S5). At this time, as described before, the CPU 10 effects the operation for the positional error amount of "(A−B)/(A+B)", drives the actuator 4 to set the positional error amount to "0" and thus positions the read head 20 at the track center TC. When the read head 20 is positioned at the center TC of the target track N, the read head effects the reading operation for reading out recording data from the data sector of the target track N (step S6).

On the other hand, at the time of data writing operation, the CPU 10 positions the write head 21 at the center TC of the target track N based on the amplitude values E, F corresponding to the burst patterns E, F read out by the read head 20 ("NO" in the step S4 and step S7). That is, as shown in FIG. 9, the CPU 10 positions the read head 20 at the preset position X3 based on the amplitude values E, F. At this time, as described before, the CPU 10 effects the operation of "(E−F)/(E+F)" for the positional error amount, drives the actuator 4 to set the positional error amount to "0" and thus positions the read head 20 at the preset position X3.

In this case, as shown in FIG. 9, it is supposed that the offset GAP in the radial direction is set between the gap center of the write head 21 and the gap center of the read head 20. Therefore, if the read head 20 is positioned at the preset position X3 which is offset from the center TC of the target track N, the write head 21 is positioned at the center TC of the target track N as a natural consequence. In this state, the write head 21 effects the writing operation for writing data into the data sector of the target track N (step S8).

As described above, servo burst data in the second embodiment contains the burst patterns E, F used for canceling the offset between the read head 20 and the write head 21 among the burst patterns. Therefore, the offset between the gaps of the read head 20 and write head 21 of the reproduction/recording separation type head 2 can be canceled. As a result, the read head 20 can be positioned at the track center TC at the time of data reading operation and the write head 21 can be positioned at the track center. TC at the data writing operation and thus the data reading operation and data writing operation can be stably effected.

(Modification of Second Embodiment)

FIG. 11 shows a modification of the second embodiment and first and second burst patterns A and B are set as one set of burst patterns arranged in opposite positions in the radial direction with the preset position X3 in the track range set as a reference. Further, fifth and sixth burst patterns E and F are set as one set of burst patterns arranged in opposite positions in the radial direction with the track center (TC) set as a boundary (reference). Further, third and fourth burst patterns C and D are arranged in positions which are respectively offset from the adjacent track boundaries according to the amounts of offset (X3) of the burst patterns A, B from the track center TC.

Figure 12:
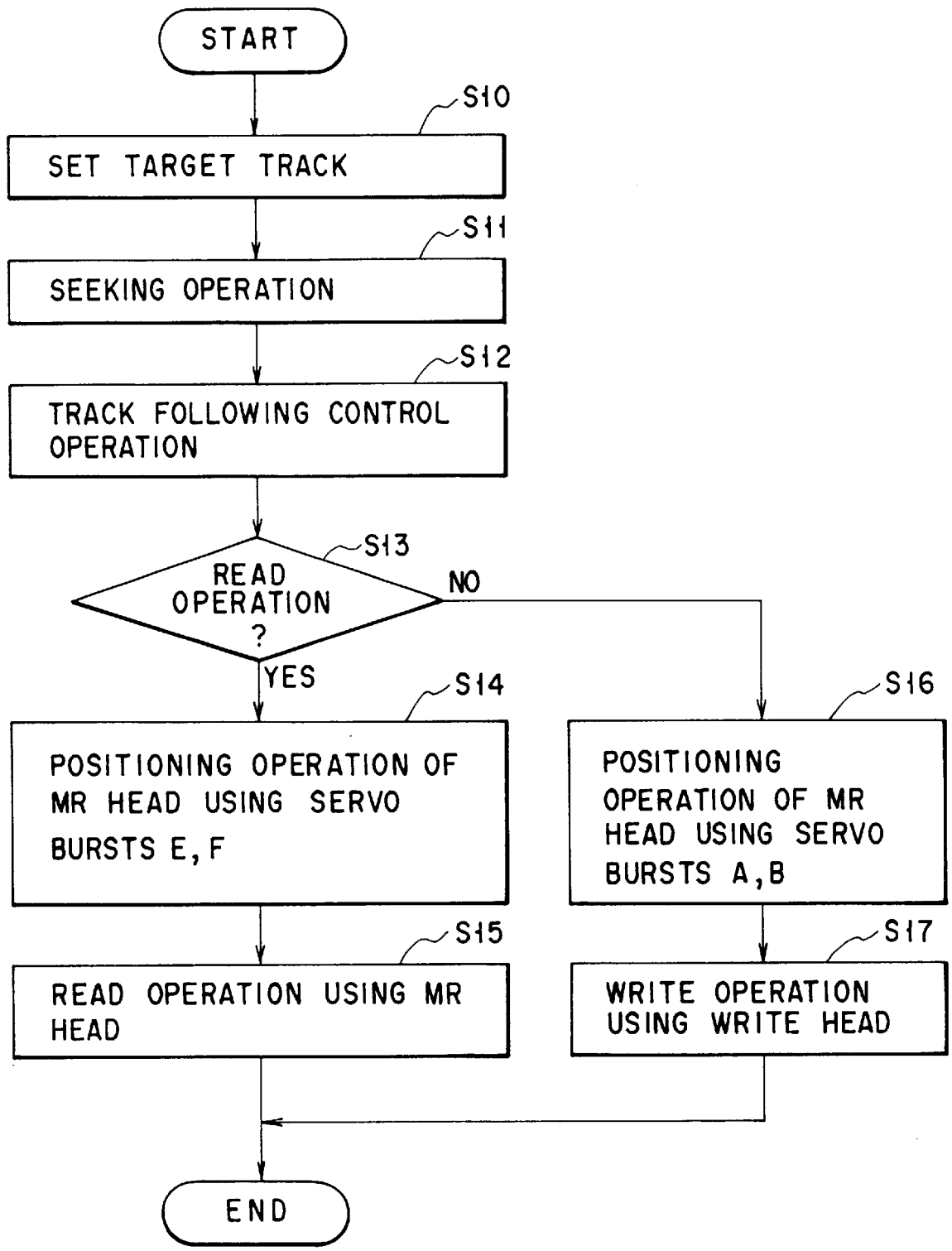
FIG. 12 is a flowchart relating to the modification of the second embodiment.

Next, the head positioning control using servo burst data of the above modification is explained with reference to the flowchart shown in FIG. 12.

First, as described before, in the HDD, when the target track N is set, the CPU 10 effects the seeking operation based on cylinder data of servo information to move the head 2 to the target track N (step S10, S11). When the head 2 is moved into the range of the target track N or to a position near the range thereof by the seeking operation, the CPU 10 changes the operation to the track following control operation (step S12). In this modification, the CPU 10 derives the positional error of the read head 20 based on the amplitude values E, F corresponding to the burst patterns E, F at the time of data reading operation.

That is, at the time of data reading operation, the CPU 10 positions the read head 20 at the center TC of the target track N based on the amplitude values E, F corresponding to the burst patterns E, F read out by the read head 20 ("YES" in the step S13 and step S14). The CPU 10 effects the operation of "(E−F)/(E+F)" for the positional error amount, drives the actuator 4 to set the positional error amount to "0" and thus positions the read head 20 at the center TC of the target track N. When the read head 20 is positioned at the center TC of the target track N, the read head 20 effects the reading operation for reading out recording data from the data sector of the target track N (step S15).

On the other hand, at the time of writing operation, the CPU 10 positions the write head 21 at the center TC of the target track N based on the amplitude values A, B corresponding to the burst patterns A, B read out by the read head 20 ("NO" in the step S13 and step S16). That is, as shown in FIG. 11, the CPU 10 positions the read head 20 at the preset position X3 based on the amplitude values A, B. At this time, as described before, the CPU 10 effects the operation of "(A−B)/(A+B)" for the positional error amount, drives the actuator 4 to set the positional error amount to "0" and thus positions the read head 20 at the preset position X3.

In this case, as shown in FIG. 11, it is supposed that the offset GAP in the radial direction is set between the gap center of the write head 21 and the gap center of the read head 20. Therefore, if the read head 20 is positioned at the preset position X3 which is offset from the center TC of the target track N, the write head 21 is positioned at the center TC of the target track N as a natural consequence. In this state, the write head 21 effects the writing operation for writing data into the data sector of the target track N (step S17).

As described above, in the above modification, the fifth and sixth burst patterns E, F are recorded with the track center TC set as a boundary unlike the second embodiment. In this case, the normal burst patterns A to D are recorded by use of a dedicated writing device for servo data called a servo writer in the HDD manufacturing process. In the system of the second embodiment, it is supposed that added burst patterns E, F are also recorded by use of the servo writer in the HDD manufacturing process. Unlike this case, in the system of the above modification, since the burst patterns E, F are recorded in position with the center of the track set as a reference, the burst patterns E, F can be recorded by using the write head 21 of the HDD based on the normal burst patterns A to D. That is, the burst patterns E, F can be written by use of the head 2 of the HDD itself by the self-servo system without using the servo writer. The other effects are the same as those of the second embodiment.
(Third Embodiment)

As shown in FIG. 13, in the third embodiment of this invention, in the construction of servo burst data having fifth and sixth burst patterns E, F recorded together with first to fourth burst patterns A to D, the burst patterns E and F are arranged with positions (X2, X4, X6, X8) deviated from the respective track centers TC by ±¼ track set as boundaries (references). The head positioning control using servo burst data of the above construction is explained.

Figure 19:
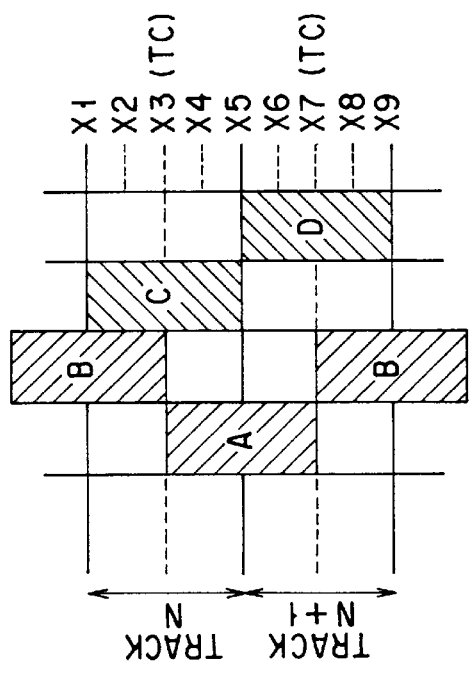
FIG. 19 is a conceptional diagram for illustrating the construction of burst patterns relating to the prior art.

As shown in FIG. 19, in the construction of the conventional servo burst data, the burst patterns A and B are alternately arranged with one track width with the centers TC of the respective tracks set as boundaries (X3, X7) and the burst patterns C and D are alternately arranged with one track width with the boundary X5 between the adjacent tracks as a boundary. The relation between the position of the head (read head 20) and the difference (A−B) and the difference between C and D derived in the operation for the positional error can be expressed as shown in FIG. 20 by use of the peak values A to D corresponding to the burst patterns A to D.

Figure 20:
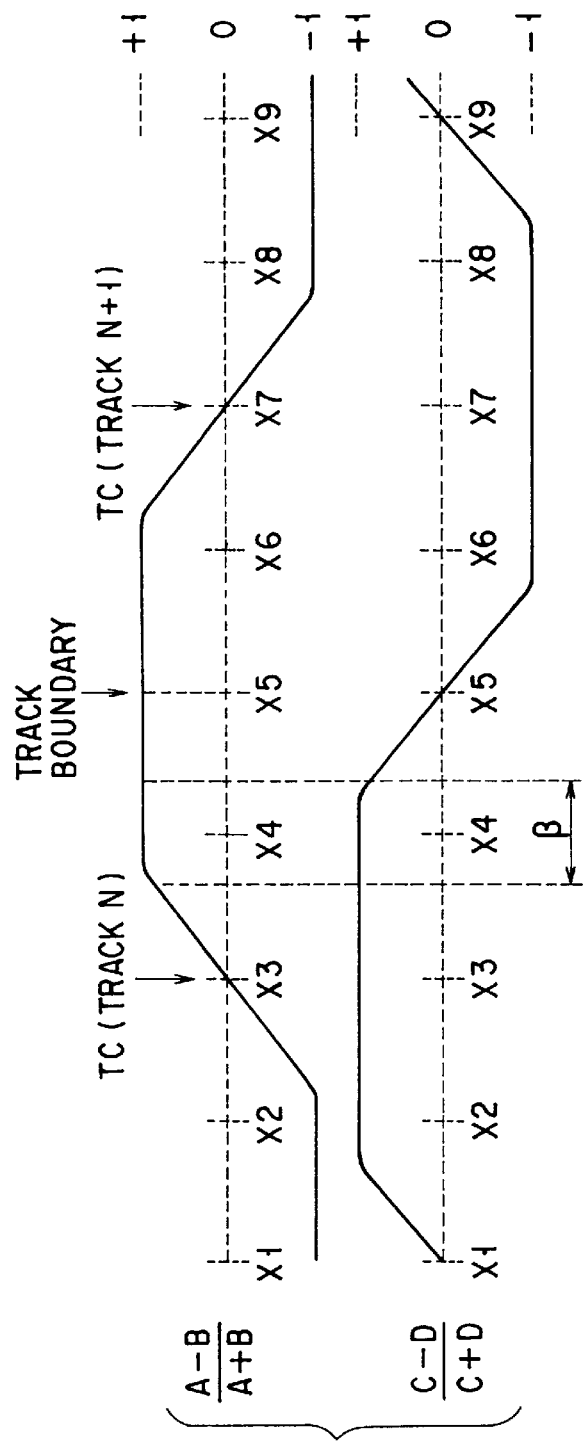
FIG. 20 is a characteristic diagram of the positional error relating to the prior art.

As is clearly seen from FIG. 20, when the head is set in position in a range of ±¼ track from the center of the track, the difference (A−B) linearly varies with a variation in the head position (linear area LS). More specifically, the linear relation is obtained in a range between the position X2 deviated from the center TC (X3) of the track N by an amount of −¼ track and the position X4 deviated from the center TC (X3) of the track N by an amount of +¼ track, for example. In this case, since (A+B) is constant, (A−B)/(A+B) is also set in the linear relation with respect to a variation in the head position (however, a portion near the position deviated from the track center by an amount of ±¼ track is omitted). Therefore, the burst patterns A, B are used for the positioning control in the above range. Specifically, when the head is set at the track center TC, the burst patterns A and B become equal to each other.

On the other hand, if the head is set in position deviated from the track center TC by an amount of ±¼ track or more, that is, when the head is set in a range of ±¼ track from the boundary between the tracks, one of the burst patterns A and B is always set to "0" irrespective of the head position. More specifically, the above range is set between the position X4 deviated from the boundary X5 between the tracks N and (N+1) by an amount of −¼ track and the position X6 deviated from the boundary X5 between the tracks N and (N+1) by an amount of +¼ track, for example. In the above range, correct position information cannot be obtained by using the burst patterns A, B. On the other hand, the difference (C−D) between the burst patterns C and D is set in the linear relation with a variation in the head position in the above range. Therefore, the burst patterns C, D are used for the positioning control in the above range.

In order to derive position information (the positional error of the head from the track center TC) of the head from the amplitude values (peak values) corresponding to the burst patterns, the following equation is used.

$$\{(A-B)/(A+B)\}*G \quad (1)$$

where G is a correction coefficient determined by the width of the head, the track width (track pitch) or the like.

The head positioning control device feeds back the position information of the head derived according to the equation (1) and positions the head at the center of the target track.

When the burst signals C, D are used, it is only necessary to replace (A+B) by (C+D) and replace (A−B) by (C−D) in the above equation (1). However, since the position information obtained at this time indicates the positional deviation amount of the head from the boundary between the tracks, it is necessary to add or subtract a ½ track width (or a value corresponding thereto) to or from the above positional deviation amount in order to derive the positional deviation amount of the head from the track center.

As shown in FIG. 20, the result (difference) of calculation for the positional error contains a value obtained in a range (non-linear range or non-sensible area) which becomes non-linear depending on the head position. In the case of FIG. 20, the above range is a range β of an area near the position deviated from the track center by an amount of ±¼ track. In the range β, the reliability of burst data is low and the set of the burst patterns A and B and the set of the burst patterns C and D overlap each other. Therefore, if the head is set in the non-linear range β, correct position information cannot be obtained by using either the set of the burst patterns A and B or the set of the burst patterns C and D and the precise positioning control cannot be effected.

Therefore, in this embodiment, servo burst data is constructed by using a set of fifth and sixth burst patterns E and F which are alternately arranged with a width equal to half the track pitch with the position deviated from the track center by an amount of ±¼ track set as a boundary in addition to the set of the first and second burst patterns A and B and the set of the third and fourth burst patterns C and D so as to effect the precise positioning control even if the head is set in any position on the disk.

Next, this embodiment is explained in detail with reference to FIGS. 13 to 18. As described before, in the servo sector of this embodiment, the first to sixth burst patterns A to F are recorded as shown in FIG. 13. As shown in FIG. 14, in the servo sector, servo burst data areas a to f having the burst patterns A to F recorded therein are provided in addition to an AGC stabilizing area 111, a sector data area 112 in which sector data indicating the erase and servo sector number is recorded, and a cylinder data area 113 in which cylinder data indicating a track address (cylinder address) is recorded. The recording width of the burst patterns A, B, C, D is the same as the track pitch like the conventional case, and the recording width of the burst patterns E, F is equal to half the track pitch.

As shown in FIG. 13, the burst patterns A and B are alternately arranged with one track width with the track center (TC) set as a boundary. The burst patterns C and D are alternately arranged with one track width with the boundary between adjacent tracks set as a boundary. Further, the burst patterns E and F are one set of patterns having different phases and alternately arranged with a width equal to half the track pitch with the position deviated from the track center (TC) by a ±¼ track width (which is equal to ¼ of the track pitch) set as a reference and with the position deviated from the track boundary by a ±¼ track width set as a reference.

Next, the positioning control operation in this embodiment is explained with reference to the flowchart of FIG. 15.

When the HDC 12 is supplied with a read/write command or seek command from the host system, it creates cylinder data indicating a target track (target cylinder) at which the head 2 is positioned based on a logic address contained in the command and outputs the data to the CPU 10. The CPU 10 changes the operation to the track following control operation for seeking the head 2 to the target track and positioning the head at the center of the target track.

At the time of track following control operation, the peak values of the burst patterns A to F read out by the read head 20 are held by a sample-hold circuit 32 as shown in FIG. 3. The CPU 10 receives the peak values A to F (which are hereinafter simply referred to as A to F) as digital data, and as described before, it effects the arithmetic operation for deriving the positional error (difference) used for detecting the position of the head 2 (read head 20).

Figure 16:
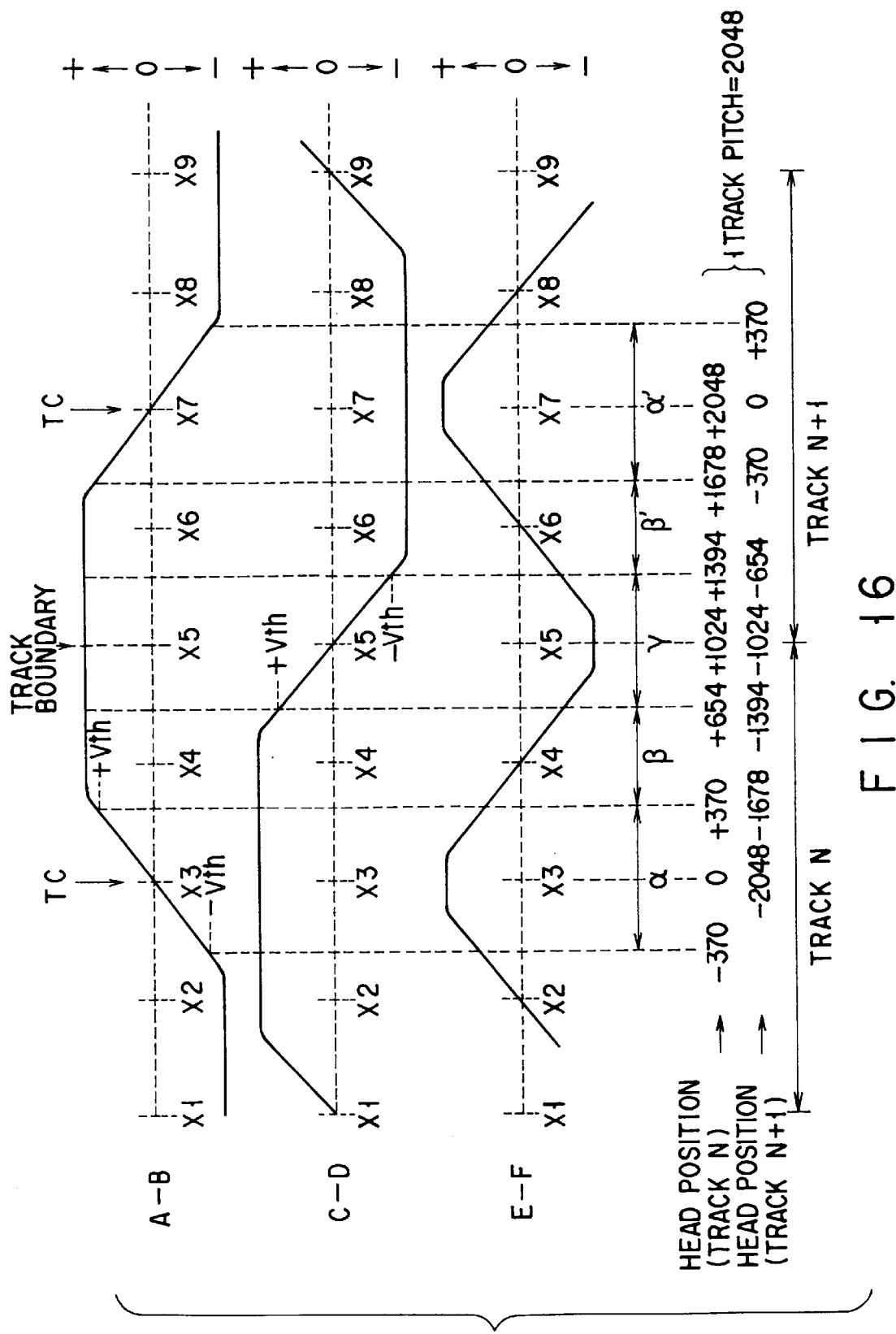
FIG. 16 is a characteristic diagram of the positional error relating to the third embodiment.
Figure 17:
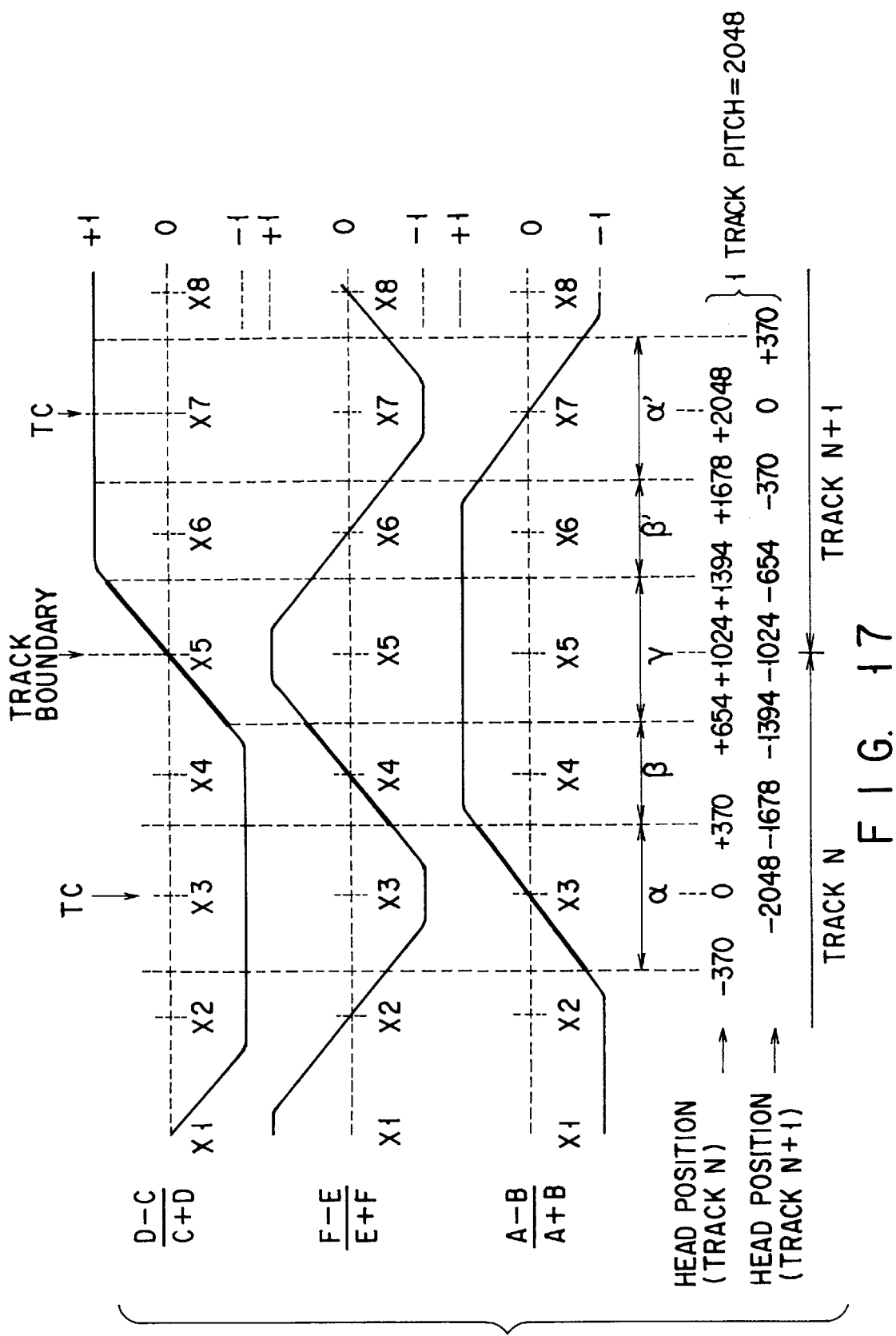
FIG. 17 is a characteristic diagram of the positional error relating to the third embodiment.

The relations of the difference (A–B) (A–B characteristic) between A and B, the difference (C–D) (C–D characteristic) between C and D, and the difference (E–F) (E–F characteristic) between E and F with respect to the position of the head 2 are shown in FIG. 16. Further, the (D–C)/(D+C) characteristic, the (F–E)/(F+E) characteristic, and the (A–B)/(A+B) characteristic with respect to the position of the head 2 are shown in FIG. 17. Also, the (E–F)/(E+F) characteristic and the (B–A)/(A+B) characteristic with respect to the position of the head 2 are shown in FIG. 18.

The CPU 10 derives the difference (A–B) between A and B and determines whether or not the head 2 is present in a range in which the value of (A–B) is set in the linear relation with respect to a variation in the head position, that is, in the linear range of the A–B characteristic (which is a range indicated by $\alpha$ or $\alpha'$ in FIG. 16, for example, and is a range obtained by removing partial areas near the positions deviated from the track center by ±¼ track from the range of ±¼ track distance from the track center) according to whether or not the absolute value of the value (A–B) is equal to or smaller than a threshold value Vth (step S20).

Figure 18:
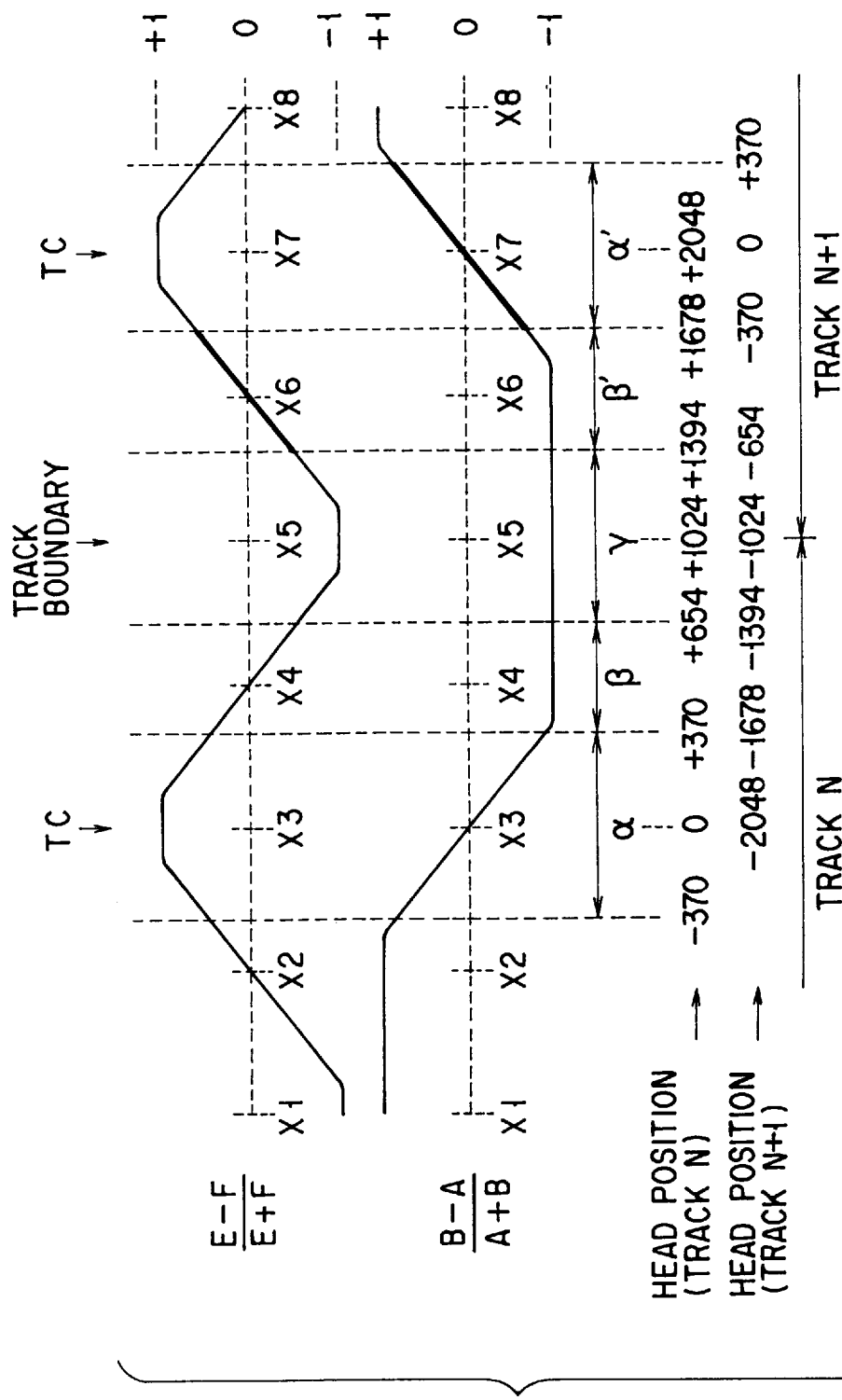
FIG. 18 is a characteristic diagram of the positional error relating to the third embodiment.

If the absolute value of the value (A–B) is equal to or smaller than the threshold value Vth, the CPU 10 determines that the head 2 is present in the linear range ($\alpha$ or $\alpha'$) of the A–B characteristic and therefore position information (positional error) of the head 2 can be precisely derived by use of A, B. In this case, the CPU 10 derives position information of the head 2 (step S21) according to the following equation (2) by using the (A–B)/(A+B) characteristic indicated by the heavy line in of FIG. 17 when the head 2 is present in the linear range ($\alpha$) in which the inclination of the A–B characteristic is positive, $$\{(A-B)/(A+B)\}*G \tag{2}$$

and derives position information of the head 2 (step S21) according to the following equation (3) by using the (B–A)/(A+B) characteristic indicated by the heavy line in $\alpha'$ of FIG. 18 when the head 2 is present in the linear range ($\alpha'$) in which the inclination of the A–B characteristic is negative.

$$\{(B-A)/(A+B)\}*G \tag{3}$$

In the above equations, G indicates a correction coefficient (burst position conversion coefficient) determined by the width of the head 2, the track width (track pitch) and the like, and in this embodiment, the value of G which causes position information (positional error) to be set to $2^{13}=2048$ when a deviation of one track width occurs is used.

Further, whether the head 2 is present in $\alpha$ (in the linear range in which the inclination of the A–B characteristic is positive) or in $\alpha'$ (in the linear range in which the inclination of the A–B characteristic is negative) is determined according to whether the value of (C–D) is positive or negative as is clearly seen from FIG. 16. In this case, the sign (positive or negative) of the positional deviation amount of the head 2 from the track center is set to "positive" when the head position is deviated in the right direction (in a direction in which the track number increases) from the track center in FIGS. 16 to 18 and to "negative" when the head position is deviated in the left direction (in a direction in which the track number decreases) from the track center.

When the head 2 is present in the range $\alpha$, cylinder data indicating the cylinder N is decoded and the positional deviation amount (the normalized value thereof) of the head 2 from the center of the cylinder N (=track n) is derived. Further, when the head 2 is present in the range $\alpha'$, cylinder data indicating the cylinder (N+1) is decoded and the positional deviation amount (the normalized value thereof) of the head 2 from the center of the cylinder (N+1) (=track (n+1)) is derived.

On the other hand, if the absolute value of (A–B) exceeds the threshold value Vth, the CPU 10 determines that the head 2 is present in position outside the linear range ($\alpha$, $\alpha'$) of the A–B characteristic and A, B cannot be used for deriving the position information of the head 2.

In this case, the CPU 10 derives the difference (C–D) between C and D and determines whether or not the head 2 is present in a range in which the value of (C–D) is set in the linear relation with respect to a variation in the head position, that is, in the linear range of the C–D characteristic (which is a range indicated by $\gamma$ in FIG. 16, for example, and is a range obtained by removing partial areas near the positions deviated from the track boundary by ±¼ track from the range of ±¼ track distance from the track boundary) according to whether or not the absolute value of the value (C–D) is equal to or smaller than the threshold value Vth (step S22).

If the absolute value of the value (C–D) is equal to or smaller than the threshold value Vth, the CPU 10 determines that the head 2 is present in the linear range of the C–D characteristic and therefore position information (positional error) of the head 2 can be precisely derived by use of C, D. In this case, the CPU 10 derives position information of the head 2 (step S23) according to the following equation (4) by using the (C–D)/(C+D) characteristic in the linear range in which the inclination of the C–D characteristic is positive when the head 2 is present in the above linear range, $$\{(C-D)/(C+D)\}*G \tag{4}$$

and derives position information of the head 2 (step S23) according to the following equation (5) by using the (D–C)

/(C+D) characteristic indicated by the heavy line in γ of FIG. 17 when the head 2 is present in the linear range (γ) in which the inclination of the C–D characteristic is negative.

$$\{(D-C)/(C+D)\}*G \quad (5)$$

In this case, whether the head 2 is present in the linear range in which the inclination of the C–D characteristic is positive or in the linear range (γ) in which the inclination of the C–D characteristic is negative is determined according to whether the value of (A–B) is negative or positive as is clearly seen from FIG. 16.

The position information derived by use of the equation (4) or (5) indicates the positional deviation amount of the head 2 from the track boundary. Therefore, in order to derive the positional deviation amount of the head 2 from the track center, it is necessary to add or subtract the normalized value (in this example, 2048/2=1024) of ½ track width. In the example of the linear range (γ) of the C–D characteristic of FIG. 16, selection of addition or subtraction is determined according to the positive or negative sign of the value (A–B) and whether the cylinder number indicated by cylinder data decoded by the servo processing circuit 9 is even or odd.

For example, when the value (A–B) is positive (that is, when the equation (5) is used) and the cylinder number N of the track n in FIG. 16 is even, addition is selected if the cylinder number indicated by cylinder data is even and subtraction is selected if the cylinder number is odd. Further, when the value (A–B) is positive and the cylinder number N of the track N in FIG. 16 is odd, subtraction is selected if the cylinder number indicated by cylinder data is even and addition is selected if the cylinder number is odd.

On the other hand, when the value (A–B) is negative (that is, when the equation (4) is used) and the cylinder number N of the track N in FIG. 16 is odd, subtraction is selected if the cylinder number indicated by cylinder data is even and addition isselected if the cylinder number is odd.

Further, when the value (A–B) is negative and the cylinder number N of the track N in FIG. 16 is odd, addition is selected if the cylinder number indicated by cylinder data is even and subtraction is selected if the cylinder number is odd.

In the linear range of the C–D characteristic, cylinder data may indicate either the cylinder N or the cylinder (N+1) when taking γ as an example. Therefore, in an example in which the linear range of the C–D characteristic is γ, if the cylinder N is decoded (read out), the positional deviation amount (the normalized value thereof) of the head 2 from the center of the cylinder N (=track n) is derived and if the cylinder (N+1) is decoded, the positional deviation amount (the normalized value thereof) of the head 2 from the center of the cylinder (N+1) (=track (N+1)) is derived.

On the other hand, if the absolute value of (C–D) exceeds the threshold value Vth, the CPU 10 determines that the head 2 is present in position outside the linear range of the C–D characteristic such as γ in FIG. 16 (as well as the linear range of the A–B characteristic such as α, α' in FIG. 16) and C, D cannot be used for deriving the position information of the head 2.

In this case, the CPU 10 determines that the head 2 is present in an area in which the non-linear range of the A–B characteristic and the non-linear range of the C–D characteristic overlap each other (which corresponds to a range indicated by β or β' in FIG. 16, for example, and is an area near the position deviated from the track center and track boundary by ±¼ track). The area (β, β') is a linear range of the E–F characteristic as is clearly seen from FIG. 16.

Figure 8:
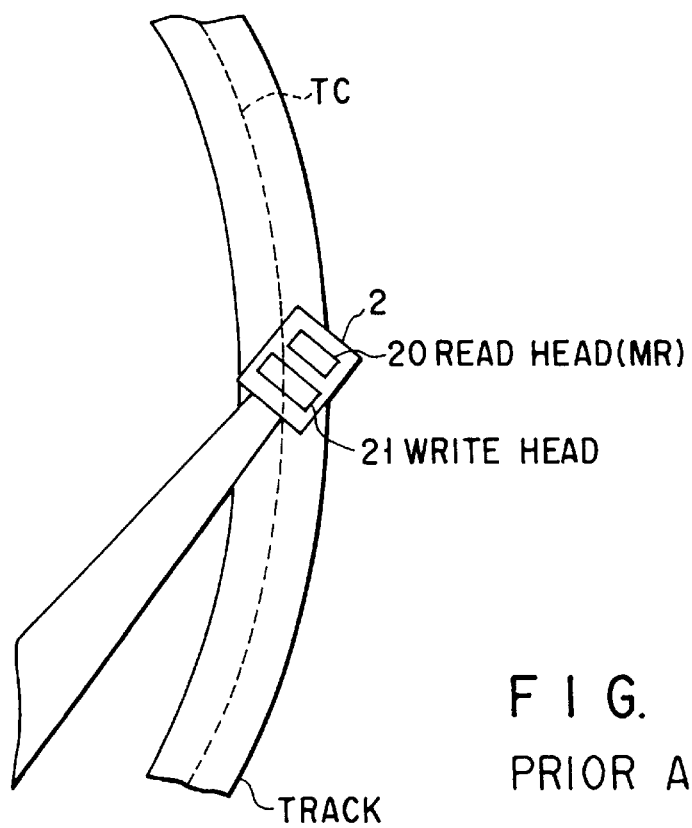
FIG. 8 is a conceptional diagram for illustrating the positional relation between the track and a read head relating to prior art.

If the head 2 is present in the linear range (β') in which the inclination of the E–F characteristic is positive, the CPU 10 derives position information (positional error) of the head 2 (step S24) according to the following equation (6) by using the (E–F)/(E+F) characteristic indicated by the heavy line in the range β' in FIG. 8, $$\{(E-F)/(E+F)\}*G \quad (6)$$

and if the head 2 is present in the linear range (β) in which the inclination of the E–F characteristic is negative, the CPU 10 derives position information (positional error) of the head 2 (step S24) according to the following equation (7) by using the (F–E)/(E+F) characteristic indicated by the heavy line in the range β in FIG. 17.

$$\{(F-E)/(E+F)\}*G \quad (7)$$

In this case, whether the head 2 is present in the linear range (β') in which the inclination of the E–F characteristic is positive or in the linear range (β) in which the inclination of the C–D characteristic is negative is determined according to whether the value of (A–B) and the value (C–D) have the different sign or the same sign as is clearly seen from FIG. 16.

The position information derived by use of the equation (6) or (7) indicates the positional deviation amount of the head 2 with the position which is deviated from the track center by ±¼ track set as a reference. Therefore, in order to derive the positional deviation amount of the head 2 from the track center, it is necessary to add or subtract the normalized value (in this example, 2048/4=512) of ¼ track width. In this example, addition is effected when the equation (6) is used, and subtraction is effected when the equation (7) is used.

When the head 2 is present in β, cylinder data indicating the cylinder N is decoded and the positional deviation amount (the normalized value thereof) of the head 2 from the center of the cylinder N (=track n) is derived. Further, when the head 2 is present in β', cylinder data indicating the cylinder (N+1) is decoded and the positional deviation amount (the normalized value thereof) of the head 2 from the center of the cylinder (N+1) (=track (n+1)) is derived.

When the CPU 10 derives the position information (the normalized value of the positional deviation amount of the head 2 from the track center) of the head 2 in the step S21, S23 or S24, the CPU 10 controls the movement of the head 2 according to the positional deviation amount (positional error amount) indicated by the position information so as to position the head 2 at the track center of the target cylinder (step S25). The movement control of the head 2 is effected by driving the VCM 5 via the motor driver 6.

In a case where a reproduction/recording separation type head constructed by the write head 21 and read head 20 is used as the head 2, the result of calculation for the positional error in the step S21, S23 or S24 may be corrected (by adding or subtracting the value of a gap Δ) by an amount of the gap Δ (the normalized value of the gap Δ when one track pitch is set to 2048) between the read head 20 (the center thereof) and the write head 21 (the center thereof) in order to position the write head 21 at the center TC of the target track for data writing, that is, to position the read head 20 in a position (off-track position) deviated from the track center TC.

In this embodiment, since the read head 20 is always set into the linear range of the C–D characteristic or the linear range of the E–F characteristic even if the read head 20 is set in position deviated from the track center TC, correct head position information can be derived.

In the embodiments described above, a case wherein the calculation (the process in the step S24 in FIG. 15) for position information is effected according to the equation (6) or (7) by using E, F in the linear range (β, β') of the E–F characteristic, that is, the range (β, β') in which the A–B characteristic and the C–D characteristic are both non-linear is explained, but this is not limitative. For example, instead of the process of step S24, a first position information deriving process for deriving position information of the head 2 by using the set of A, B and the set of E, F or a second position information deriving process for deriving position information of the head 2 by using the set of the burst outputs C, D and the set of E, F can be used as is explained below.

The first position information deriving process is to compensate for the A–B characteristic in the range (β, β') in which the A–B characteristic and the C–D characteristic are both non-linear by use of the E–F characteristic which becomes linear in the above range. The first position information deriving process is sequentially and separately explained for a case wherein the head 2 is present in the range of β and a case wherein the head is present in the range of β'.

When the head 2 is present in the range of β, the CPU 10 derives position information of the head 2 in the above range according to the following equation (8).

$$[\{(A-B)/(A+B)\}*G]+[\{(F-E)/(E+F)\}*G+\Delta 1] \quad (8)$$

where Δ1 is an offset and is set to a value expressed by the following equation (9) in the boundary of "α→β".

$$\{(F-E)/(E+F)\}*G+\Delta 1=0 \quad (9)$$

The reason is explained below.

First, {(F–E)/(E+F)}*G takes a negative value in the boundary of "α→β" as is clearly seen from FIG. 17. Further, in the boundary of "α→β", the value of {(A–B)/(A+B)}*G indicates the position of the head 2 in the boundary of "α→β" (the normalized position of the head 2 with the center of the track n set as a reference) as is clearly seen from FIG. 17 and is 370 (constant value) in the example of FIG. 16.

The position of the head 2 in β takes a value of 370 to 654 in the example of FIG. 16. The value can be expressed by (370+0) to (370+284), and it equivalently takes a value of 0 to 284 if the boundary of "α→β" is set to 0 (reference). Therefore, it is only necessary for {(F–E)/(E+F)}*G+Δ1 to take a value of 0 to 284, and as the offset Δ1, a value which causes the value of {(F–E)/(E+F)}*G+Δ1 to be set to 0 as indicated by the equation (9) in the boundary of "α→β" is used.

When the head 2 is present in the range of β', the CPU 10 derives position information of the head 2 in the above range according to the following equation (10).

$$[\{(B-A)/(A+B)\}*G]-[\{(E-F)/(E+F)\}*G+\Delta 2] \quad (10)$$

where Δ2 is an offset and is set to a value expressed by the following equation (11) in the boundary of "α'→β'".

$$\{(E-F)/(E+F)\}*G+\Delta 2=0 \quad (11)$$

The second position information deriving process is to compensate for the C–D characteristic in the range (β, β') in which the A–B characteristic and the C–D characteristic are both non-linear by use of the E–F characteristic which becomes linear in the above range. The second position information deriving process is sequentially and separately explained for a case wherein the head 2 is present in the range of β and a case wherein the head is present in the range of β'.

When the head 2 is present in the range of β, the CPU 10 derives position information of the head 2 in the above range according to the following equation (12).

$$[\{(D-C)/(C+D)\}*G]+[\{(F-E)/(E+F)\}*G+\Delta 3] \quad (12)$$

where Δ3 is an offset and is set to a value expressed by the following equation (13) in the boundary of "γ→β".

$$\{(F-E)/(E+F)\}*G+\Delta 3=0 \quad (13)$$

When the head 2 is present in the range of β', the CPU 10 derives position information of the head 2 in the above range according to the following equation (14).

$$[\{(D-C)/(C+D)\}*G]-[\{(E-F)/(E+F)\}*G+\Delta 4] \quad (14)$$

where Δ4 is an offset and is set to a value expressed by the following equation (15) in the boundary of "γ→β".

$$\{(E-F)/(E+F)\}*G+\Delta 4=0 \quad (15)$$

As described above, if the head 2 is set into the range β or β', that is, into the range β or β' in which both of the A–B characteristic and the C–D characteristic exceed the threshold value Vth, the position information of the head 2 may be derived according to the equation (8) or (10) or the equation (12) or (14) instead of the process of step S5.

Further, when the head 2 is set into the boundary of "α→β", the calculation can be easily effected if the position information of the head 2 is derived according to the equation (8) since the burst outputs A, B are used for deriving the position information in the range α. Likewise, when the head 2 is set into the boundary of "γ→β", the calculation can be easily effected if the position information of the head 2 is derived according to the equation (12) since the burst outputs C, D are used for deriving the position information in the range γ.

Further, when the head 2 is set into the boundary of "α'→β'", the calculation can be easily effected if the position information of the head 2 is derived according to the equation (10) since the burst outputs A, B are used for deriving the position information in the range α'. Likewise, when the head 2 is set into the boundary of "γ→β'", the calculation can be easily effected if the position information of the head 2 is derived according to the equation (14) since the burst outputs C, D are used for deriving the position information in the range γ.

In the above embodiments, the magnetic disk device is explained, but this invention can also be generally applied to a data recording/reproducing apparatus such as a photomagnetic disk apparatus for effecting the seeking and positioning control to seek and position the head to a target position on the recording medium based on servo data recorded on the recording medium (disk).

As described above, according to this invention, by using servo burst data construction in which the fifth and sixth burst patterns E and F having a width equal to half the track pitch with the position which is deviated from the track center by ±¼ track set as a boundary are recorded in addition to the conventional first to fourth burst patterns A to D, it becomes possible to always set the head in the linear range of the A–B characteristic, the linear range of the C–D characteristic, or the linear range of the E–F characteristic even if the head is set in any position on the disk, and thus the precise head positioning control can always be effected.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An apparatus for head positioning control in a disk storage system using a disk as data storage media, the apparatus comprising:

the disk having concentric tracks formed thereon each of which includes a plurality of data sectors for recording user data and a plurality of servo sectors having servo information recorded thereon, the servo information containing servo burst data for positioning the head in a range of a track, the servo burst data including at least first to sixth burst patterns, the burst patterns being respectively offset from the adjacent burst patterns thereof in the radial direction and successively arranged at preset intervals, and the boundaries of said adjacent offset burst patterns used for deriving a positional error of the head being set to coincide with the center of the track, the boundary between the adjacent tracks, and a prescribed position between said boundary between the adjacent tracks, and said center of the track;

control means for deriving a positional error in a range of the specified track of the head based on the servo burst data read out from the track by the head and creating a control signal for positioning the head in a preset position in the range of the track; and actuator means for positioning the head in the preset position in the range of the track according to the control signal output from the control means, wherein the servo burst data includes:

a first burst pair having a first burst pattern (A) and a second burst pattern (B) which are adjacent to each other in a radial direction of the disk with a boundary thereof set at the center of the track;

a second burst pair having a third burst pattern (C) and a fourth burst pattern (D) which are adjacent to each other in the radial direction of the disk with a boundary thereof set at the boundary between the adjacent tracks; and a third burst pair having a fifth burst pattern (E) and a sixth burst pattern (F) which are adjacent to each other in the radial direction of the disk with a boundary thereof set in a prescribed position between the center of the track and the boundary between the adjacent tracks, and the control means derives a positional error of the head in relation to the center of the track based on the first burst pair, a positional error of the head in relation to the border between the adjacent tracks based on the second burst pair, and a positional error of the head in relation to the prescribed position based on the third burst pair.

2. The apparatus according to claim 1, wherein the servo burst data further includes:

a fourth burst pair having a seventh burst pattern (G) and a eighth burst pattern (H) which are adjacent to each other in the radial direction of the disk with a boundary thereof set in another prescribed position between the center of the track and the boundary between the adjacent tracks, and the control means derives a positional error of the head in relation to said prescribed position based on the third burst pair, and a positional error of the head in relation to said another prescribed position based on the fourth burst pair.

* * * * *

UNITED STATES PATENT AND TRADEMARK OFFICE
CERTIFICATE OF CORRECTION

PATENT NO. : 5,892,634
DATED : April 6, 1999
INVENTOR(S) : Hiroshi Ito et al.

It is certified that error appears in the above-identified patent and that said Letters Patent is hereby corrected as shown below:

Column 1, line 1 and on the
Title Page, Item [54], in the Title, line 1, "HEAT" should read --HEAD--.

Signed and Sealed this

Eighteenth Day of January, 2000

Attest:

Q. TODD DICKINSON

*Attesting Officer*        *Commissioner of Patents and Trademarks*